United States Patent
Marple et al.

(10) Patent No.: US 8,785,044 B2
(45) Date of Patent: Jul. 22, 2014

(54) LITHIUM-IRON DISULFIDE CATHODE FORMULATION HAVING PYRITE CONTENT AND LOW CONDUCTIVE ADDITIVES

(75) Inventors: Jack W Marple, Westlake, OH (US); Weiwei Huang, Westlake, OH (US); Michael W Wemple, Westlake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 660 days.

(21) Appl. No.: 12/869,244

(22) Filed: Aug. 26, 2010

(65) Prior Publication Data

US 2011/0008660 A1 Jan. 13, 2011

Related U.S. Application Data

(63) Continuation-in-part of application No. 12/253,516, filed on Oct. 17, 2008, and a continuation-in-part of application No. 12/480,015, filed on Jun. 8, 2009.

(60) Provisional application No. 61/237,496, filed on Aug. 27, 2009.

(51) Int. Cl.
| | |
|---|---|
| *H01M 4/58* | (2010.01) |
| *H01M 4/62* | (2006.01) |
| *H01M 4/38* | (2006.01) |
| *H01M 4/06* | (2006.01) |
| *H01M 2/02* | (2006.01) |
| *H01M 6/16* | (2006.01) |
| *H01M 4/40* | (2006.01) |
| *H01M 4/86* | (2006.01) |

(52) U.S. Cl.
CPC ............... *H01M 4/06* (2013.01); *H01M 4/625* (2013.01); *H01M 2/022* (2013.01); *H01M 4/382* (2013.01); *H01M 4/5815* (2013.01); *H01M 6/164* (2013.01); *H01M 4/405* (2013.01); *Y02E 60/12* (2013.01); *H01M 2220/30* (2013.01); *H01M 2004/8689* (2013.01)
USPC .......................................... 429/221; 429/232

(58) Field of Classification Search
None
See application file for complete search history.

(56) References Cited

U.S. PATENT DOCUMENTS

| | | | |
|---|---|---|---|
| 345,123 | A | 7/1886 | Dana et al. |
| 4,163,829 | A | 8/1979 | Kronenberg |
| 4,279,972 | A | 7/1981 | Moses |
| 4,375,815 | A | 3/1983 | Burns |

(Continued)

FOREIGN PATENT DOCUMENTS

| | | |
|---|---|---|
| CN | 1564370 A | 1/2005 |
| CN | 1790781 A | 6/2006 |

(Continued)

OTHER PUBLICATIONS

Human assisted machine translation of CN 1564370, Jan. 2005.*

(Continued)

*Primary Examiner* — Jonathan Crepeau
(74) *Attorney, Agent, or Firm* — Robert C. Baraona

(57) ABSTRACT

The invention relates to primary electrochemical cells having a jellyroll electrode assembly that includes a lithium-based negative electrode, a positive electrode with a coating comprising iron disulfide deposited on a current collector and a polymeric separator. More particularly, the invention relates to a cell designs and cathode formulations incorporating specific types of conductors to improve cell performance.

16 Claims, 11 Drawing Sheets

(56) References Cited

U.S. PATENT DOCUMENTS

| | | |
|---|---|---|
| 4,379,815 A | 4/1983 | Bubnick |
| 4,401,735 A | 8/1983 | Moses et al. |
| 4,450,214 A | 5/1984 | Davis |
| 4,481,267 A | 11/1984 | Bowden et al. |
| 4,489,144 A | 12/1984 | Clark |
| 4,526,846 A | 7/1985 | Kearney et al. |
| 4,808,497 A | 2/1989 | Blomgren et al. |
| 4,891,283 A | 1/1990 | Bowden et al. |
| 4,952,330 A | 8/1990 | Leger et al. |
| 5,158,722 A | 10/1992 | Ilic et al. |
| 5,176,968 A | 1/1993 | Blasi et al. |
| 5,219,683 A | 6/1993 | Webber |
| 5,229,227 A | 7/1993 | Webber |
| 5,290,414 A | 3/1994 | Marple |
| 5,432,030 A | 7/1995 | Vourlis |
| 5,514,491 A | 5/1996 | Webber |
| 5,595,841 A | 1/1997 | Suzuki |
| 5,691,083 A | 11/1997 | Bolster |
| 6,027,835 A | 2/2000 | Fukumura et al. |
| 6,218,054 B1 | 4/2001 | Webber |
| 6,287,719 B1 | 9/2001 | Bailey |
| 6,602,593 B1 | 8/2003 | Callahan et al. |
| 6,623,892 B1 | 9/2003 | Yamaguchi et al. |
| 6,730,136 B2 | 5/2004 | Webber |
| 6,849,360 B2 | 2/2005 | Marple |
| 7,157,185 B2 | 1/2007 | Marple |
| 7,687,189 B2 | 3/2010 | Wu et al. |
| 2002/0064706 A1 | 5/2002 | Zhang et al. |
| 2002/0090544 A1 | 7/2002 | Fujita et al. |
| 2002/0160251 A1 | 10/2002 | Chang et al. |
| 2003/0070283 A1 | 4/2003 | Webber |
| 2003/0113622 A1 | 6/2003 | Blasi et al. |
| 2003/0118909 A1 | 6/2003 | Paulot et al. |
| 2003/0228518 A1 | 12/2003 | Marple |
| 2004/0265700 A1 | 12/2004 | Ugawa et al. |
| 2005/0079404 A1 | 4/2005 | Schubert |
| 2005/0112462 A1 | 5/2005 | Marple |
| 2005/0112467 A1 | 5/2005 | Berkowitz et al. |
| 2005/0202320 A1 | 9/2005 | Totir et al. |
| 2005/0233214 A1 | 10/2005 | Marple et al. |
| 2005/0244706 A1 | 11/2005 | Wu et al. |
| 2005/0277023 A1 | 12/2005 | Marple et al. |
| 2006/0008701 A1 | 1/2006 | Kim et al. |
| 2006/0046152 A1 | 3/2006 | Webber |
| 2006/0046153 A1 | 3/2006 | Webber |
| 2006/0046154 A1 | 3/2006 | Webber |
| 2007/0202409 A1 | 8/2007 | Yamakawa et al. |
| 2007/0275298 A1 | 11/2007 | Igoris et al. |
| 2008/0026288 A1 | 1/2008 | Marple |
| 2008/0026293 A1 | 1/2008 | Marple et al. |
| 2008/0050653 A1 | 2/2008 | Berkowitz et al. |
| 2008/0050654 A1* | 2/2008 | Stevanovic ............... 429/221 |
| 2008/0057403 A1 | 3/2008 | Issaev et al. |
| 2008/0076022 A1 | 3/2008 | Marple |
| 2008/0213651 A1 | 9/2008 | Wu et al. |
| 2008/0226982 A1 | 9/2008 | Schubert |
| 2008/0254343 A1 | 10/2008 | Kaplin et al. |
| 2008/0274406 A1* | 11/2008 | Fuse et al. ............... 429/231.4 |
| 2009/0070989 A1 | 3/2009 | Pozin et al. |
| 2009/0074953 A1 | 3/2009 | Chang et al. |
| 2009/0104520 A1 | 4/2009 | Marple |
| 2009/0148756 A1 | 6/2009 | Specht et al. |
| 2009/0186276 A1* | 7/2009 | Zhamu et al. ............... 429/221 |

FOREIGN PATENT DOCUMENTS

| | | |
|---|---|---|
| CN | 1845364 A | 10/2006 |
| EP | 1296389 A1 | 3/2003 |
| JP | 04-012471 A | 1/1992 |
| JP | 04-109551 A | 10/1992 |
| JP | 06-177255 A | 6/1994 |
| JP | 10-12220 A | 1/1998 |
| JP | 11-265707 A | 9/1999 |
| JP | 2006-100164 A | 4/2006 |
| JP | 2007080791 A | 3/2007 |
| WO | 03105255 A2 | 12/2003 |

OTHER PUBLICATIONS

U.S. Appl. No. 10/675,512, filed Sep. 30, 2003.
U.S. Appl. No. 11/313,509, filed Dec. 31, 2005.
U.S. Appl. No. 11/508,672, filed Aug. 23, 2006.
U.S. Appl. No. 11/508,860, filed Aug. 23, 2006.
Ishikawa, et al. "In Situ Scanning Vibrating Electrode Technique for the Characterization of Interface Between Lithium Electrode and Electrolytes Containing Additives," Electrochemical Society Letters, V. 141, p. L159-L161, 1994.
Ishikawa, et al. "Pretreatment of Li metal anode with electrolyte additive for enhancing Li cycleability", Journal of Power Sources, V. 146, p. 199-203, 2005.
Linden, David. Handbook of Batteries, Ch. 11, 1995.
Linden, David. Handbook of Batteries, Table of Contents, 1995.
Wissler, Mathis. "Graphite and carbon powders for electrochemical applications", Journal of Power Sources 156 (2006) 142-150, Apr. 18, 2006.
Igor V. Barsukov, Maritza A. Gallego and Joseph E. Doninger. "Novel materials for electrochemical power sources—introduction of PUREBLACK Carbons", Journal of Power Sources 153 (2006) 288-299, Jul. 12, 2005.
Patent Cooperation Treaty (PCT), International Search Report and Written Opinion for Application No. PCT/US2010/002347, filed Aug. 26, 2010, mailed Oct. 12, 2010, United States Patent and Trademark Office.

* cited by examiner

US 8,785,044 B2

LITHIUM-IRON DISULFIDE CATHODE FORMULATION HAVING PYRITE CONTENT AND LOW CONDUCTIVE ADDITIVES

CROSS REFERENCE TO RELATED APPLICATIONS

To the extent permitted under U.S. law, this application is a continuation-in-part of U.S. patent application Ser. No. 12/253,516, filed on Oct. 17, 2008 and Ser. No. 12/480,015 filed on Jun. 8, 2009. Both applications are incorporated by reference as if fully rewritten herein. This application also claims priority to U.S. Provisional Patent Application No. 61/237,496 filed on Aug. 27, 2009.

FIELD OF INVENTION

The invention relates to primary electrochemical cells having a jellyroll electrode assembly that includes a lithium-based negative electrode, a positive electrode with a coating comprising iron disulfide deposited on a current collector and a polymeric separator. More particularly, one embodiment of the invention relates to a cell designs and cathode formulations incorporating specific types of conductors at specific packing percentages in order to provide an improved electrochemical cell. A second embodiment relates to cell designs and cathode formulations incorporating specific amounts of graphitized carbon, a specialized form of carbon black, in order to improve the cell's high rate performance characteristics.

BACKGROUND

Electrochemical cells are presently the preferred method of providing cost effective portable power for a wide variety of consumer devices. The consumer device market dictates that only a handful of standardized cell sizes (e.g., AA or AAA) and specific nominal voltages (typically 1.5 V) be provided. Moreover, more and more consumer electronic devices, such as digital still cameras, are being designed with relatively high power operating requirements. As has been the practice within the market, consumers often prefer and opt to use primary batteries for their convenience, reliability, sustained shelf life and more economical per unit price as compared to currently available rechargeable (i.e., secondary) batteries.

Within this context, it is readily apparent that design choices for primary (i.e., non-rechargeable) battery manufacturers are extremely limited. For example, the necessity of using specified nominal voltages significantly limits the selection of potential electrochemical materials, and the use of standardized cell sizes restricts the overall available internal volume available for active materials, safety devices and other elements typically expected in such consumer products. What's more, the variety of consumer devices and the range of operating voltages for those devices make smaller nominal voltage cells (which can be provided separately or in series, thereby giving device makers more design options) more versatile as compared to higher voltage electrochemical pairings typically associated with secondary batteries. Thus, 1.5 V systems, such as alkaline or lithium-iron disulfide systems, are far more prominent than others, such as 3.0 V and higher lithium-manganese dioxide.

Within the realm of 1.5 V systems, lithium-iron disulfide batteries (also referred to as $LiFeS_2$, lithium pyrite or lithium iron pyrite) offer higher energy density, especially at high drain rates, as compared to alkaline, carbon zinc or other systems. However, current regulatory limitations on the amount of lithium (the preferred electrochemically active material in the anode) make the FR03 (AAA $LiFeS_2$ cells) and FR6 (AA $LiFeS_2$ cells) sizes the most significant cell sizes for this chemistry within the consumer market.

The design considerations for 1.5V electrochemical systems (e.g., alkaline v. lithium-iron disulfide, etc.) are significantly different. For example, alkaline and nickel oxy-hydroxide systems rely on an aqueous and highly caustic electrolyte that has a propensity for gas expansion and/or leakage, leading to very different approaches in terms of selection of internal materials and/or compatibility with containers and closures. In rechargeable 1.5 V systems (note that lithium-iron disulfide systems are not currently considered suitable for consumer-based rechargeable systems), various highly specialized electrochemical and/or electrolyte compositions may be used to best accommodate lithium ion charge/discharge cycling. Here, such high cost components are not a key design concern because secondary systems typically sell for a higher retail price than their primary battery equivalents. Moreover, the discharge mechanisms, cell designs and safety considerations are, by and large, inconsequential and/or inapplicable to primary systems.

Improvements to capacity represent a fundamentally sound battery design. That is, in order to deliver greater capacity, careful consideration must be given for the radial expansion forces and other dynamics at work in a discharging lithium-iron disulfide battery. For example, if the design provides inadequate thickness in the anode or the cathode current collector then the radial forces during discharge may compress the jellyroll to such a degree so as to cause a disconnect in one or both electrodes and, once this disconnect occurs, the battery may cease to deliver capacity regardless of whether the active materials have all been discharged. Similar situations arise with respect to the void volume (in the cathode coating and the interior of the cell as a whole), the electrical connections throughout the battery, the separator, the closure/venting mechanism for the battery and the like. Therefore, the capacity of a $LiFeS_2$ cell is a significant metric for the overall viability and robustness of a cell design, particularly when the cell designer is limited to the use of a standard-sized consumer battery (e.g., AA or FR6; AAA or FR03; etc.)

As a corollary to the capacity acting as a de facto metric for battery design, those skilled in the art will appreciate that design choices, and particularly the selection of specific components, must be made in consideration of the overall battery. A specific composition may have surprising, unexpected or unintended effects upon the other components and compositions within the cell. Similarly, in standard sized batteries, the selection of a particular element occupies volume within the container that might otherwise have been available for other elements. Thus, this interdependency of design choices necessarily means that any increase in capacity, and especially an increase that does not negatively impact the safety or performance of the battery in other regards, is much more than a simple act of adding more active materials.

Yet another important consideration for cell designers in $LiFeS_2$ systems relates to minimizing the internal resistance of the cell. Generally speaking, the internal resistance is caused by the components used to make the cell, and can be expressed as follows:

$$R_{cell} = R_{container} + R_{electrode\ assembly}$$

The resistance from the container components ($R_{container}$) includes resistance caused by the can (including external contact terminals), internal electrical connections (e.g., welds or pressure contacts), internal safety devices (e.g., PTC) and the like. Typically, the resistance from these container components will behave in a relatively predictable and easy to control manner, thereby making it relatively simple to minimize this contribution.

However, the resistance caused by the electrode assembly ($R_{electrode\ assembly}$) can be an indicator of the overall quality of the design because this resistance is much more difficult to predict and control. Moreover, in a lithium cell where the anode consists essentially of highly conductive lithium or a lithium-based alloy, the resistance of the electrode assembly will depend and vary almost entirely upon the selection of the separator and the cathode. Thus, how and what is coated onto the cathode current collector, in conjunction with selection of an appropriate separator, can be viewed as having a direct, measurable effect on the overall resistance of a cell. Extending this concept one step further, in a series of cells where the components of the container and the separator are essentially identical, the overall resistance of the cell will serve as an excellent proxy of comparison as to the desirability of the cathodes for those cells.

Even with the inherent advantages of lithium-iron disulfide cells for high power devices (as compared to primary alkaline cells), $LiFeS_2$ cell designs must strike a balance between the cost of materials used, the incorporation of necessary safety devices and the overall reliability, delivered capacity and intended use of the designed cell. Normally, low power designs emphasize the quantity of active materials, while high power designs focus more on configurations to enhance discharge efficiency. For example, a jellyroll design maximizes the surface area between the electrodes and allows for greater discharge efficiencies, but in doing so, might sacrifice capacity on low power and low rate discharges because it uses more inactive materials, such as separator and current collector(s) (both which occupy internal volume, thereby requiring removal of active materials from the cell design).

In addition to improved capacity, cell designers must also consider other important characteristics, such as safety and reliability. Safety devices normally include venting mechanisms and thermally activated "shutdown" elements, such as positive thermal circuits (PTCs). Improvements to reliability primarily focus on preventing internal short circuits. In both instances, these characteristics ultimately require elements that occupy internal volume and/or design considerations that are usually counterproductive to cell internal resistance, efficiency and discharge capacity. Moreover, there are additional challenges because transportation regulations limit the percent amount of weight lithium batteries can lose during thermal cycling, meaning that cell designs for smaller container sizes like AA and AAA can only lose milligrams of total cell weight (usually by way of evaporation of the electrolyte). Plus, the reactive and volatile nature of the non-aqueous, organic electrolyte severely limits the universe of potential materials available (particularly with respect to interactions between the electrolyte and cell closure, separator and/or current collector(s) provided within the cell) as compared to other electrochemical systems.

Ultimately, maximizing the amounts of active materials in lithium-iron disulfide batteries while maintaining optimal properties, particularly with respect to the cathode, may be the most difficult challenge. As noted above, the jellyroll electrode assembly is the preferred configuration in $LiFeS_2$ systems. In order to accommodate iron disulfide most effectively, the iron disulfide is mixed into slurry with conductors and binders and then coated onto a metallic foil current collector, while the lithium is most effectively provided without a current collector. Lastly, the separator is a thin polymeric membrane whose thickness is preferably minimized to reduce the inactive inputs into the cell.

Because the reaction end products occupy more volume than the inputs, the electrode assembly swells as the battery discharges. In turn, swelling creates radial forces that can cause unwanted bulging of the cell container, as well as short circuits if the separator is compromised. Previous means of handling these problems include using strong (often thicker) materials for the cell housing and inactive components within the cell. However, thicker inactive materials limit the internal volume available and thicker, more rugged electrodes were previously deemed not necessarily desirable because they allow for fewer winds possible in the jellyroll, resulting in less surface area between the electrodes and the expectation of comparatively lower performance at higher drain rates.

A number of other approaches have been taken to strike an appropriate balance between optimal internal volume utilization and acceptable $LiFeS_2$ cell capacity/performance. For example, a possible solution for problems created by swelling, disclosed in U.S. Pat. No. 4,379,815, is to balance cathode expansion and anode contraction by mixing one or more other active materials (such as $CuO$, $Bi_2O_3$, $Pb_2Bi_2O_5$, $P_3O_4$, $CoS_2$) with pyrite, although these additional materials can negatively affect the discharge characteristics of the cell, and the capacity and efficiency of the overall cell may also suffer.

Other means of improving discharge capacity in $LiFeS_2$ cell contemplate the use of thinner separators and/or specific cathode coating techniques and pyrite particle sizes, as respectively disclosed in U.S. Patent Publication Nos. 20050112462 and 20050233214.

U.S. Pat. Nos. 6,849,360 and 7,157,185 discloses the use of a specific cathode coating formulation and an anode provided as pure lithium (or a lithium-aluminum alloy) to obviate the need for an anode current collector. The amount of anode and cathode are then provided at specified ratio of anode to cathode interfacial active materials (i.e., the theoretical interfacial input capacity ratio) in order to enhance $LiFeS_2$ cell high rate performance.

U.S. Patent Publication Nos. 20090070989 and 20080050654 and Chinese Patent Publication Nos. 1845364 disclose cathode formulations have 95 wt. % or less of $FeS_2$ that may be pertinent to cathode coatings for electrodes in $LiFeS_2$ cells. United States Patent Publication No. 20070202409 and Chinese Patent Publication Nos. 1790781 disclose cathode formulations having at least 3 wt. % of binders that may also be pertinent to cathode coatings for electrodes in $LiFeS_2$ cells. Chinese Patent Publication No. 1564370 generically discloses a mixture of pyrite, binders and conductors that may be pertinent to $LiFeS_2$ cells.

DESCRIPTION OF A PREFERRED EMBODIMENT OF THE INVENTION

Figure 1:
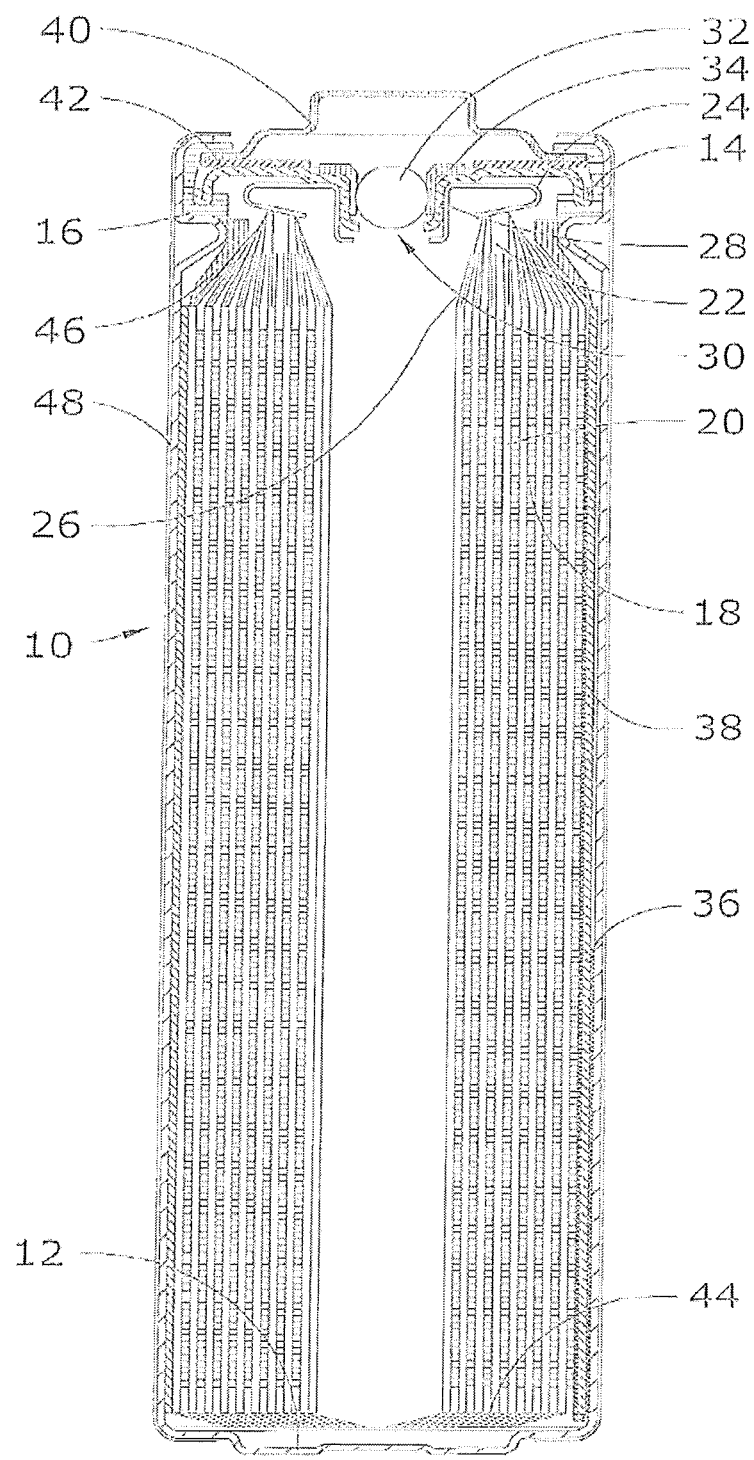
FIG. 1 illustrates one embodiment of a cell design for a lithium-iron disulfide electrochemical cell.

Unless otherwise specified, as used herein the terms listed below are defined and used throughout this disclosure as follows:

ambient temperature or room temperature—between about 20° C. and about 25° C.; unless otherwise stated, all examples, data and other performance and manufacturing information were conducted at ambient temperature;

anode—the negative electrode; more specifically, in a lithium-iron disulfide cell, it consists essentially of lithium or lithium-based alloy (i.e., an alloy containing at least 90% lithium by weight) as the primary electrochemically active material;

capacity—the capacity delivered by a single electrode or an entire cell during discharge at a specified set of conditions (e.g., drain rate, temperature, etc.); typically expressed in milliamp-hours (mAh) or milliwatt-hours (mWh) or by the number of minutes or images taken under a digital still camera test;

cathode—the positive electrode; more specifically, in a lithium-iron disulfide cell, it comprises iron disulfide as the primary electrochemically active material, along with one or more rheological, polymeric and/or conductive additives, coated onto a metallic current collector;

Digital Still Camera Test (also referred to as the ANSI Digital Still Camera Test)—a camera takes two pictures (images) every minute until the battery life is exhausted, following the testing procedure outlined in ANSI C18.3M, Part 1-2005 published by the American National Standard for Portable Lithium Primary Cells and Batteries—General and Specifications and entitled, "Battery Specification 15LF (AA lithium iron disulfide), Digital camera test". This test consists of discharging a AA sized lithium iron disulfide battery at 1500 mW for 2 seconds followed by 650 mW for 28 second, with this 30 second cycle repeated for a total cycle of 5 minutes (10 cycles) and followed by a rest period (i.e., 0 mW) for 55 minutes. The entire hourly cycle 24 hours per day until a final 1.05 voltage or less is recorded. Each 30 second cycle is intended to represent one digital still camera image. This test may be scaled for use on smaller electrodes to simulate the performance of a AA battery.

electrochemically active material—one or more chemical compounds that are part of the discharge reaction of a cell and contribute to the cell discharge capacity, including impurities and small amounts of other moieties present;

FR6 cell—With reference to International Standard IEC-60086-1 published by the International Electrotechnical Commission on after November 2000, a cylindrical cell size lithium iron disulfide battery with a maximum external height of about 50.5 mm and a maximum external diameter of about 14.5 mm;

FR03 cell—With reference to International Standard IEC-60086-1 published by the International Electrotechnical Commission on after November 2000, a cylindrical cell size lithium iron disulfide battery with a maximum external height of about 44.5 mm and a maximum external diameter of about 10.5 mm;

"jellyroll" (or "spirally wound") electrode assembly—strips of anode and cathode, along with an appropriate polymeric separator, are combined into an assembly by winding along their lengths or widths, e.g., around a mandrel or central core;

loading—with respect to the final dried and densified cathode mix coated to the foil current collector, the amount of specified material found a single or double-sided facing of a specified area of the current collector, typically expressed as milliamp hours of active material capacity or milligrams of total cathode mix (i.e., including pyrite, binders, conductors, additives, etc.) on a single side or both sides of a one square centimeter portion of the current collector that is interfacially aligned;

nominal—a value, typically specified by the manufacturer, that is representative of what can be expected for that characteristic or property;

pyrite—a mineral form of iron disulfide, typically containing at least 95% electrochemically active iron disulfide (approximately, $FeS_2$) when used in batteries, which may include impurities, other moieties and other minor amounts of potentially electrochemically active material;

solids packing—in a coating, but excluding the current collector, the ratio of volume in the coating occupied by solid particles (e.g., electrochemically active material, binder, conductor, etc.) as compared to the total volume of that coating, measured after the coating has been dried and densified; typically expressed as a percentage but also can be expressed as the inverse of the coating's porosity or void (i.e., 100% minus the percent porosity of the coating);

specific energy density—the capacity of the electrode, cell or battery, according to the stated conditions (e.g., discharge at 200 mA continuous drain, total input on an interfacial capacity, etc.) divided by the total weight of the entire cell or battery generally expressed in watt-hours/kilogram (Wh/kg) or milliwatt-hours/gram (mWh/g);

Cell Components

The invention will be better understood with reference to FIG. 1. In FIG. 1, the cell 10 is one embodiment of a FR6 (AA) type cylindrical $LiFeS_2$ battery cell, although the invention should have equal applicability to FR03 (AAA) or other cylindrical cells. The cell 10 has, in one embodiment, a housing that includes a container in the form of can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode or negative electrode 18, a cathode or positive electrode 20 and electrolyte within the cell 10.

The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal lead (or tab) 36. The lead 36 is fastened to the anode 18, extends from the bottom of the electrode assembly, and is folded across the bottom and up along the side of the electrode assembly. The lead 36 makes pressure contact with the inner surface of the side wall of the can 12. After the electrode assembly is wound, it can be held together before insertion by tooling in the manufacturing process, or the outer end of material (e.g., separator or polymer film outer wrap 38) can be fastened down, by heat sealing, gluing or taping, for example.

In one embodiment, an insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12.

In one embodiment, the cell 10 has a separate positive terminal cover 40, which is held in place by the inwardly crimped top edge of the can 12 and the gasket 16 and has one or more vent apertures (not shown). The can 12 serves as the negative contact terminal. An insulating jacket, such as an adhesive label 48, can be applied to the side wall of the can 12.

In one embodiment, disposed between the peripheral flange of the terminal cover 40 and the cell cover 14 is a positive temperature coefficient (PTC) device 42 that substantially limits the flow of current under abusive electrical conditions. In another embodiment, the cell 10 may also include a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10. In other embodiments, the pressure relief vent can be an aperture closed by a rupture membrane, such as disclosed in U.S. Pat. No. 7,687,189, or a relatively thin area such as a coined groove, that can tear or otherwise break, to form a vent aperture in a portion of the cell, such as a sealing plate or container wall.

In one embodiment, the terminal portion of the electrode lead 36, disposed between the side of the electrode assembly and the side wall of the can, may have a shape prior to insertion of the electrode assembly into the can, preferably non-planar that enhances electrical contact with the side wall of the can and provides a spring-like force to bias the lead against the can side wall. During cell manufacture, the shaped terminal portion of the lead can be deformed, e.g., toward the side of the electrode assembly, to facilitate its insertion into the can, following which the terminal portion of the lead can spring partially back toward its initially non-planar shape, but remain at least partially compressed to apply a force to the inside surface of the side wall of the can, thereby making good physical and electrical contact with the can. Alternatively, this connection, and/or others within the cell, may also be maintained by way of welding.

The cell container is often a metal can with a closed bottom such as the can in FIG. 1. The can material and thickness of the container wall will depend in part of the active materials and electrolyte used in the cell. A common material type is steel. For example, the can may be made of cold rolled steel (CRS), and may be plated with nickel on at least the outside to protect the outside of the can from corrosion. Typically, CRS containers according to the invention can have a wall thickness of approximately between 7 and 10 mils for a FR6 cell, or 6 to 9 mils for a FR03 cell. The type of plating can be varied to provide varying degrees of corrosion resistance, to improve the contact resistance or to provide the desired appearance. The type of steel will depend in part on the manner in which the container is formed. For drawn cans, the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover can be metal. Nickel plated steel may be used, but a stainless steel is often desirable, especially when the closure and cover are in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used to provide the desired corrosion resistance and ease of metal forming. Formed covers may also be plated, with nickel for example, or made from stainless steel or other known metals and their alloys.

The terminal cover should have good resistance to corrosion by water in the ambient environment or other corrosives commonly encountered in battery manufacture and use. The cover should also have good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket used to perfect the seal between the can and the closure/terminal cover may be made from any suitable thermoplastic material that provides the desired sealing properties. Material selection is based in part on the electrolyte composition. Examples of suitable materials include polypropylene, polyphenylene sulfide, tetrafluoride-perfluoroalkyl vinylether copolymer, polybutylene terephthalate and combinations thereof. Preferred gasket materials include polypropylene from Basell Polyolefins in Wilmington, Del., USA or polyphenylene sulfide from Chevron Phillips in The Woodlands, Tex., USA. Small amounts of other polymers, reinforcing inorganic fillers and/or organic compounds may also be added to the base resin of the gasket. Examples of suitable materials can be found in U.S. Patent Publication Nos. 20080226982 and 20050079404.

The gasket may be coated with a sealant to provide the best seal. Ethylene propylene diene terpolymer (EPDM) is a suitable sealant material, but other suitable materials can be used.

The aforementioned cell components and design features are merely exemplary and intended to display one possible embodiment of the invention. Other components and design features may be utilized.

Cathode Formulation

It has also been determined that lithium-iron disulfide batteries benefit by providing an excess of theoretical interfacial input capacity in the cathode as compared to the theoretical interfacial input capacity of the anode associated therewith, as described in U.S. Pat. No. 6,849,360. Thus, in one embodiment, cells of the invention have an interfacial anode to cathode input ratio of less than 1.00.

It is also desirable to use cathode materials with small particle sizes to minimize the risk of puncturing the separator. For example, $FeS_2$ can be sieved, at least through a 230 mesh (62 μm) screen or smaller. More preferably, the $FeS_2$ may be media milled or processed to have an average particle size less than 20 μm, as described in U.S. Patent Publication No. 20050233214.

Generally speaking, the amount of pyrite, and more particularly $FeS_2$, should be maximized, while conductors, binders and other additives should only be used in the cathode dry mix in amounts sufficient to allow for adequate coating and adhesion of the cathode material onto the solid metal foil current collector. For example, many prior art references suggest the use of at least 3 wt. % of a binder in order to insure a proper coating. Moreover, the intended coating should be porous, thin and flexible, and other cathode mixes intended for pellet-type cathodes, which tend to be substantially thicker and more inflexible than coatings, are irrelevant to the exigencies of thin coatings. Moreover, the importance of cathode porosity cannot be overlooked.

Pyrite appropriate for use in electrochemical cells, having $FeS_2$ purity in excess of 95 wt. % of the total pyrite mix, may be available from Washington Mills, North Grafton, Mass., USA; Chemetall GmbH, Vienna, Austria; and Kyanite Mining Corp., Dillwyn, Va., USA. Appropriate binders include styrene-ethylene/butylenes-styrene (SEBS) block copolymer, such as G1651 from Kraton Polymers Houston, Tex., and optional processing aides such as overbased calcium sulfonate complexes and/or fumed silica, e.g., AEROSIL® 200 from Evonik Industries AG, Essen, Germany.

With respect to the porosity, cathode coatings with solids packing percentages of less than 70%, preferably less than 65%, and preferably less than 63% possess inherent advantages in terms of ease of high speed manufacturing processes and inherent safety and performance characteristics (in that the more porous material provides voids to compensate for the greater volume required by cell reaction products). However, at these reduced packing percentages, the inventors have found that the amount and type of conductors provided to the cathode mix are extremely relevant to optimized cathode and cell performance. In particular, the amount of binder may be reduced significantly in comparison to previous coating formulations while the amount of pyrite can be greater than 95 wt. % of the total dry mix. However, in such high pyrite (i.e., 95-98 wt. %) and low binder (i.e., less than 3 wt. %) formulations, the amount and type of carbon provided is extremely significant.

Thus, the selection of certain types of conductors plays a key role in the performance of lithium-iron disulfide cells, especially when the mix formulation is optimized to maximize active materials. Specific conductors, as well as combinations of conductors, have been found to impart characteristics that desirable for specific lithium-iron disulfide cell designs. These characteristics may be further enhanced when the conductor(s) are provided in conjunction with other distinguishing aspects of the overall cell as described below; for example, when provided in combination with a specified range of solids packing for the cathode or when provided with adjustments to the functional groups present in the conductor(s).

Conductors appropriate for use as conductors in lithium-iron disulfide electrochemical cells include carbon black, acetylene black and graphite. Each type can be distinguished and selected based on a variety of factors, including crystalline structure, impurities (including but not limited to functional groups, ash, sulfur, etc.), carbon content, carbon source and processing techniques. In turn, these parameters will influence how the conductor(s) interact with the cathode coating commonly used in spirally-wound lithium-iron disulfide cells.

Carbon black is a broad category of elemental carbons produced by combustion or thermal decomposition of gaseous or liquid hydrocarbons under controlled conditions. Its physical appearance is that of a black, finely divided pellet or powder, and most commonly comes in the form of colloidal particles. Significantly, carbon black is chemically and physically distinct from soot or "black carbon", which are both generic terms referring to the relatively impure carbonaceous by-products resulting from the incomplete combustion of carbon-containing materials (e.g., oil, fuel oils, coal, paper, waste material, etc.). Carbon blacks of interest are SUPER-P or TIMREX AB55, both sold by Timcal of Westlake, Ohio, U.S.A. The selection of particular types of carbon black, consistent with the metrics and considerations mentioned below, is a significant aspect of the cathode formulation. A variety of grades of carbon blacks, amorphous carbons, graphitized carbons and acetylene blacks are available from any of the suppliers identified herein.

Acetylene black ("AB") is a particularly pure form of carbon black. Acetylene black is made by the exothermic decomposition or controlled combustion of acetylene in a controlled atmosphere. Acetylene blacks are characterized by the highest degree of aggregation and crystalline orientation as compared with all other sources of carbon black. Various acetylene black powders appropriate for use in lithium-iron disulfide cells are sold under the name Soltex ACE BLACK by Soltex Corporation of Houston, Tex., U.S.A. Acetylene blacks have been disclosed for use in electrochemical cells, although when included as part of a cathode coating mix for $Li/FeS_2$ cells, it had been believed that acetylene black should be provided as part of a mixture with graphite, with the acetylene black provided in a ratio of between about 1:1 to 1:7 of AB:graphite.

Carbon blacks may be further treated to impart physical or chemical characteristics that distinguish it from acetylene black. For example, a carbon black may be heat treated to alter its crystalline structure; floated, milled, screened, blended or mechanically treated to restrict the particle size and morphology; and/or chemically treated to affect functional groups that may be appended to the carbon. Additional information regarding preferred functional groups is described in greater detail below. As such, an almost unlimited selection of differing conductive carbons is available to an electrochemical cell designer. Typically, the most important aspects for characterizing and differentiating these various conductive carbons are purity, structure of the crystalline (if any), texture/porosity and particle size.

One type of carbon black displaying particular utility in high pyrite, low binder formulations is known as "graphitized carbon." Graphitized carbons are hydrocarbons which are partially combusted, immediately quenched with water, and then subjected to continuous high temperature purification to remove impurities and functional groups. One graphitized carbon is sold as Pure Black™ 205-110 by Superior Graphite of Chicago, Ill., U.S.A. Graphitized carbon has a highly ordered series of graphitic layers as compared to other carbon blacks, and is similar to acetylene black, except that graphitized carbons are made from hydrocarbon materials other than acetylene, allowing for a comparatively wider range of morphological properties and graphitization. In comparison to other carbon blacks, x-ray diffraction or transmission electron microscopy techniques can be used to detect the "partial graphitization" of the graphitized carbon.

Graphite is one of the allotropes of elemental (i.e., essentially pure) carbon. Unlike diamond (another well-known carbon allotrope), graphite is an electrical conductor and is often used in the electrodes of electrochemical cells. As noted above, when used in cathode coating mix for $Li/FeS_2$ cells, conventional wisdom was to incorporate graphite as the major (i.e., greater than about 45 wt. % or more of the total conductors present in the dry mix) or sole component. There are three principal types of natural graphite found, depending upon their source:

(1) Crystalline flake graphite (or flake graphite for short) occurs as isolated, flat, plate-like particles with hexagonal edges if unbroken or, when broken, irregular or angular edges;
(2) Amorphous graphite occurs as fine particles; and
(3) Lump graphite (also called vein graphite) occurs in ore deposits and appears as massive plate-like fibrous or acicular crystalline aggregates.

Graphite can also be treated or synthesized to impart certain desired characteristics or properties, such as crystalline structure, texture (as characterized by xylene density, BET specific surface area, bulk density, tap density, etc.), particle size, morphology, purity and the like. Graphite can be further treated with chemicals or mechanical forces; for example, expanded graphite is made by consecutively immersing graphite in a bath of chromic acid and concentrated sulfuric acid and/or by heat treatment. In each case, these actions force the crystal lattice planes apart, thus "expanding" the graphite. One type of synthetic, mechanically expandable graphite is sold as TIMREX MX15 by Timcal of Westlake, Ohio, U.S.A. Another graphite of interest is TIMREX KS6, also sold by Timcal. One type of natural graphite has been sold as SL20 by Superior Graphite of Chicago, Ill., U.S.A. Additional grades of synthetic and natural graphites are available from any of the suppliers identified herein.

Graphene is a one-atom-thick planar sheet of $sp^2$-bonded carbon atoms that are densely packed in a honeycomb crystal lattice. Graphene occurs naturally in graphite, which essentially is consists of a series of graphene sheets stacked together. Various types of graphene are sold by Vorbeck Materials of Jessup, Md., U.S.A.

Pyrolytic carbon is a material similar to graphite, but with some covalent bonding between its graphene sheets as a result of imperfections in its production. Highly Ordered Pyrolytic Graphite refers to graphite with an angular spread of the between the graphite sheets of less than 1° and is generally considered to be the highest-quality synthetic form of pyrolytic carbon.

Although all of these conductors all comprise carbon, there are numerous metrics which allow artisans to distinguish and select from the various conductors noted above, including but not limited to dimensions (size, length, diameter, aspect ratio, etc.), morphology, density and surface area of the particles/ powder. Additional considerations influencing the utility of a particular conductor in a lithium-iron disulfide battery include the pyrite particle size, the intended thickness of the total mix (i.e., the entire cathode coating, including pyrite, binder and conductor), the intended level of compaction for the entire coating, the delivery system for applying the coating (e.g., slurry, powder, etc.), the conductivity or resistivity of the coating, the type of coating process (e.g., slot die, three roll reverse, etc.), the solvents and/or environment associated with the delivery system/type of coating, the ability of the coating to adsorb, retain or release solvents from the coating process and the ability of the coating to adsorb or retain the electrolyte.

The material properties of conductors can be determined in a number of ways. By way of example rather than limitation, purity can be measured by ash content, moisture or carbon content; crystalline structure by x-ray diffraction; real density (e.g., xylene density, helium density, etc.); particle size distribution by laser diffraction, air classification, sieving, tap density or oil absorption; porosity/texture by gas adsorption, BET specific surface area, microscopy or mercury porosimetry; and surface morphology by gas adsorption, Raman spectrometry or active surface area measurements. With respect to functional groups present in conductors, a variety of techniques may be used, including Boehm titration, thermal gravity analysis, Fourier transform infrared spectroscopy, x-ray photoelectron spectroscopy, temperature-programmed thermodesorption or secondary mass spectrometry.

Maintaining proper particle-to-particle contact is one key to a desirable cathode formulation. That is, in view of the calendaring/compaction operations normally employed during the manufacture of iron disulfide cathodes and their propensity to expand during the discharge, adequate conductive pathways must exist within the particles of the coating to permit for the effective flow of electrons.

Graphite flakes alone in a coating formulation tend to lack the necessary conductivity because the volume of flakes required to maintain adequate conductive creates high tortuosity for ionic mobility because of the aspect ratio of graphite, thereby resulting in higher charge transfer values for the cell as a whole. Additionally, certain all-carbon black formulations tend to be incompatible with solvent based coating operations because the high surface area of the carbon creates high adsorption of the solvent, thereby resulting in mud cracking and other processing difficulties.

The inventors have now discovered that the use of relatively high ratios of graphitized carbon and/or acetylene black typically is possible in coatings that have: i) high amounts of pyrite, i.e., greater than 95 wt. % of the total dry mix, ii) low levels of conductor, i.e., less than 3 wt. % of the total dry mix, and ii) relatively minimal compaction, i.e., coatings with a solids packing of 65% or less. Such minimal compaction coatings present numerous advantages in $Li/FeS_2$ cells, both in terms of ease of manufacture and incorporation of more robust cell designs (owing to the greater void spaces afforded by the level of compaction). In view of the foregoing, the preferred approach is a combination of graphite and graphitized carbon or, in the alternative, acetylene black. In both instances, the ratio of graphite to graphitized carbon or acetylene black is greater than or equal to 55 wt. % of the total conductors present in the dry mix. However, as compaction drops to less than 60% solids packing, additional carbon may be required.

According to this approach, the resultant cathode coating will have a solids packing of at least 58%, at least 60% or at least 61%, while it will also have a solids packing of no more than 65%, no more than 64%, no more than 63% or no more than 62%. Likewise, the cathode dry mix will have at least 95 wt. %, at least 96 wt. % or about 97 wt. % of pyrite, while having no more than 3 wt. % or no more than 2 wt. % of conductors. The balance of the dry mix will be binders and processing aids, thus meaning that the mix has no more than 2 wt. %, no more than 1% or less than 1 wt. % of binders and processing aids. Stated differently, the solids packing of the coating may be between 58% to 65% in formulations including acetylene black and between 58% and 70% in formulations including graphitized carbon, although in both cases narrower ranges may present additional benefits. The preferred formulation in either case includes 95 to 98 wt. % pyrite, 1 to 3 wt. % conductor and less than 2 wt. % of binders or other processing aids. The conductor should comprise either acetylene black or graphitized carbon or combinations thereof. If graphite is also included, the graphite should in all cases (i.e., irrespective of whether acetylene black or graphitized carbon or both are present) constitute less than 50 wt. % of the total amount of conductors, with amounts of less than 45 wt. % being preferred. Likewise, mechanically expandable graphite may be preferred over other types of graphite. The combination of each of these traits (solids packing, pyrite amount, conductor amount and binder amount) cooperatively contribute to the superior performance of the cathodes contemplated herein.

Additionally, it is preferred that the conductors comprise graphitized carbon. More preferably, the conductors comprise two distinct classes of conductors from the list identified above, with one of those two class being either acetylene black or graphitized carbon. Graphite may be mixed with the acetylene black or graphitized carbon, although less graphite should be used, on a weight percentage basis, than the graphitized carbon, the acetylene black or any combination of the two. That is, the weight percentage of the total amount of conductor should be greater than 55 wt. %, of acetylene black or graphitized carbon (or a combination of the two), with the balance being other conductors, preferably one or more types of graphite. More preferably, expandable graphite should be used as the sole minor component. Mechanically expandable graphite may be preferred. In other embodiments acetylene black, graphitized carbon and mixtures thereof may be used as the sole type of conductor. In such cases, a 1:1 ratio of acetylene black to graphitized carbon may sometimes be preferred. Further details as to the preferred amounts and relative ratios of conductors can be gathered from the figures appended hereto. It will be understood that the figures are drawn to scale, so that additional preferred values and ratios may be determined therefrom.

Cathodes made according to the embodiments of the invention described above will be comparatively easier to manufacture, as compared to highly compacted coatings, owing to the reduced amount of calendaring or other compressive force required. In turn, this may enable the use of thinner separators and/or containers, thereby improving the overall energy density of the cell and enabling potential cost savings associated with these materials. Additionally, despite the minimal amounts of binder and other processing aids, the mixes disclosed herein exhibit sufficient adhesion, and in the same manner conductivity, resistance and area specific resistivity are improved despite the low amounts of conductor. Full cells constructed from these cathodes may possess comparatively good 10 kHz impedance and flash amperage, as well as superior performance on the digital still camera test, owing in part to the cell design optimization of active materials afforded by balancing the solids packing, conductors and pyrite weight percentages contemplated herein.

Given the reactivity of carbon, various functional groups may also be attached to conductive carbons. Possibilities include carboxyl, carbonyl, phenol, hydroxyl/alcohol, lactone, epoxide/ether and ketone groups, with carboxyl, phenol and lactone groups being most likely. Acidic groups would have a corresponding effect on the conductor and, presumably, the cathode formulation. Additionally, these groups can influence the hydrophilic or hydrophobic nature of the formulation, and may therefore be used to impart desired dispersion characteristics. Therefore, to the extent that functional groups can be removed or selected, conductors and particularly graphites may be tailored to specific uses. Multiple different functional groups can be attached to a single conductor particle.

However, to the extent functional groups are deliberately added or selected, the presence of such groups tends to have a negative impact upon the open circuit voltage (OCV) of lithium-iron disulfide batteries. Therefore, use of functional groups may be an effective means of controlling OCV and further improving the cathode formulation and coating, particularly at low total conductor levels (on a dry weight basis). Awareness and selection of functional groups in conductors may also lead to optimized surface area for the total conductor, which could help control and alleviate the aforementioned mud-cracking problem.

Specific means for introducing functional groups include heat treatment in the presence of oxygen, ozonation and/or the use of oxidative solutions. In the same manner, functional groups can be selectively or completely removed through heat or chemical means.

Figure 2:
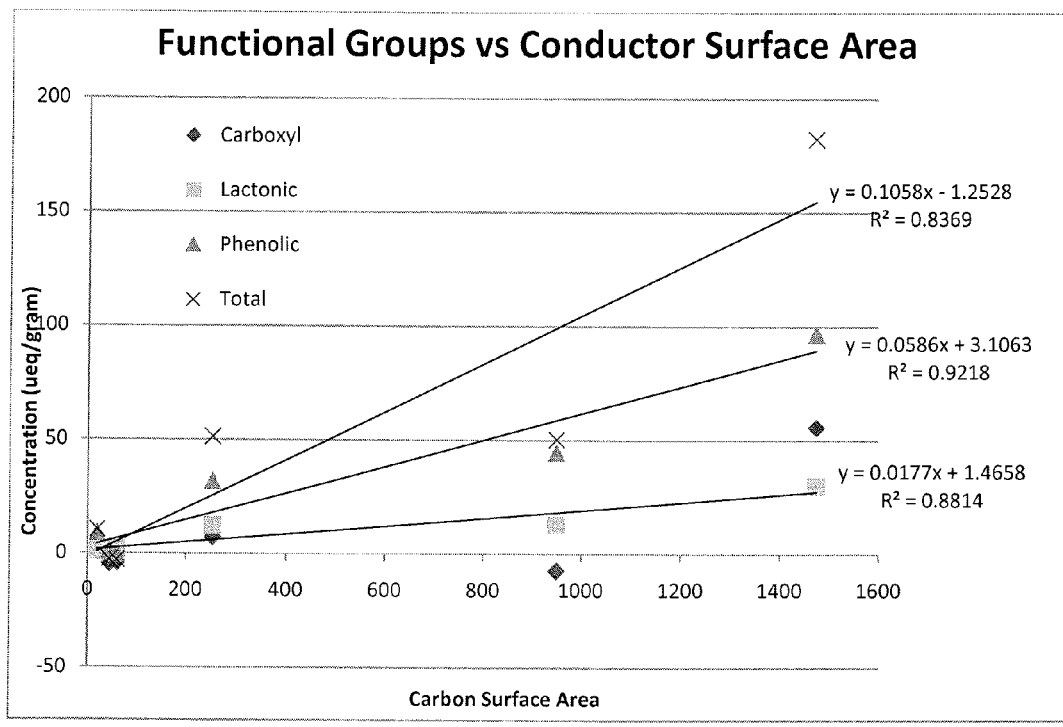
FIG. 2 illustrates the impact of various functional groups may have on the surface area of various conductors.

Using the various analyses described above, the amount of a particular functional group in a given type of conductor can be determined, along with the surface area of that conductor (e.g., BET method). FIG. 2 shows the collective results of Boehm titration analysis of functional groups across a spectrum of different conductors, including expandable graphite, graphitized carbon and carbon black (also discussed in Example 1 below). The upper most line represents the total concentration of functional groups, and the plot shows fairly good correlation (R=0.83) between the carbon surface area and the total concentration of functional groups. The middle line represents only the phenolic functional groups found in the various samples, along with a correlation (R=0.92) between phenolic functionality and carbon surface area. Finally, the bottom line shows the contribution of lactonic functionality and its correlation (R=0.88) to surface area. As such, control of these and possibly other functional groups may dictate the surface area of the conductor and, through the treatment of one or more non-functionalized conductors (e.g., graphitized carbon) or through the selective blending of conductors having differing surface areas, it may be possible to selectively tailor the surface area of the conductor.

Figure 4:
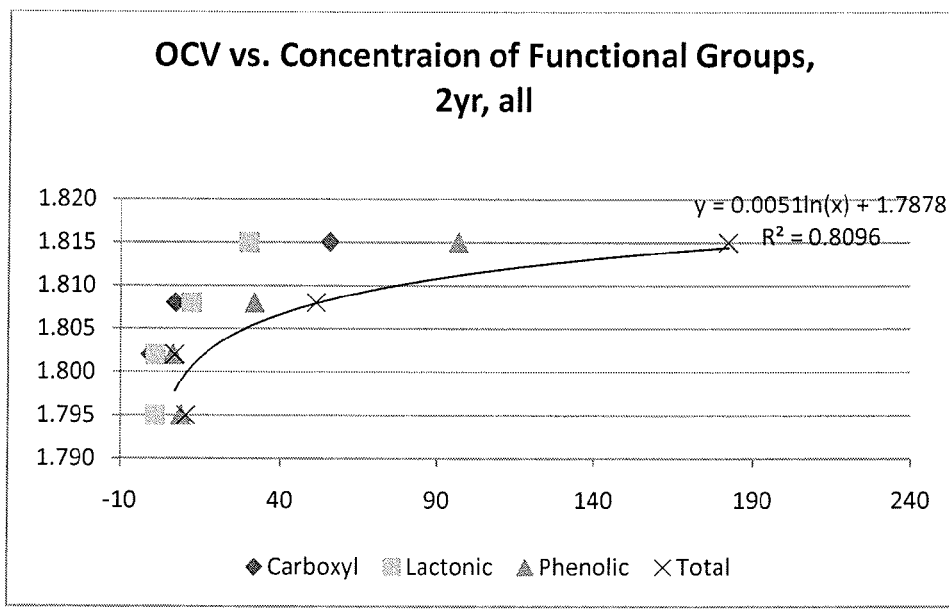
FIG. 4 illustrates the impact functional group concentration may have on the open circuit voltage of FR6 batteries.

Previous studies have shown a high correlation between the open circuit voltage (OCV) of lithium-iron disulfide cells and the surface area of the conductor used in the cathode, although surface area does not appear to correlate well to the actual performance of the cell. Moreover, a myriad of other factors (e.g., pre-discharge regimen, use of additives and/or cosolvents in the electrolyte, treatment and/or deliberate adjustment of the purity level of the pyrite, etc.) may impact OCV more definitively than the surface area of the conductor alone. Nevertheless, control of OCV is a concern for certain device manufacturers insofar as Li/FeS$_2$ cells tend to have relatively high initial OCVs compared to previous alkaline batteries which may (e.g., in excess of 1.850 V), in some case, damage the electronic components or impair the operation of some devices, while at the same time, low OCVs after storage of cells (e.g., less than 1.800 V and less than 1.750 V) may be indicative of reduced cell capacity and/or degraded cell performance. Thus, to the extent the inventors have discovered that the adjustment of surface area is possible by considering the functionalization of conductor(s), the cathode formulation (i.e., content and weight percentages of all of the components in the dry mix) and coating itself (i.e., the formulation compacted to a predetermined solids packing) may be further engineered to achieve optimal cathode properties. In particular, as demonstrated by FIG. 4, there may be advantages to selecting conductors which possess less than about 65 or less than about 50 μg/g of conductor for the high pyrite, low conductor formulations contemplated herein.

Electrode Construction

The anode comprises a strip of lithium metal, sometimes referred to as lithium foil. The composition of the lithium can vary, though for battery grade lithium the purity is always high. The lithium can be alloyed with other metals, such as aluminum, to provide the desired cell electrical performance or handling ease, although the amount of lithium in any alloy should nevertheless be maximized and alloys designed for high temperature application (i.e., above the melting point of pure lithium) are not contemplated. Appropriate battery grade lithium-aluminum foil, containing 0.5 weight percent aluminum, is available from Chemetall Foote Corp., Kings Mountain, N.C., USA. An anode consisting essentially of lithium or a lithium alloy (for example, 0.5 wt. % Al and 99+wt. % Li) is preferred, with an emphasis placed on maximizing the amount of active material (i.e., lithium) in any such alloy.

As in the cell in FIG. 1, a separate current collector (i.e., an electrically conductive member, such as a metal foil of copper and/or other high conductivity metal(s) that is/are stable when exposed to the other interior components of the cell, on which the anode is welded or coated, or an electrically conductive strip running along substantial portions the length of the anode such that the collector would be spirally wound within the jellyroll) is not needed for the anode, since lithium has a high electrical conductivity. By not utilizing such a current collector, more space is available within the container for other components, such as active materials.

The electrical connection is maintained between each of the electrodes and the opposing external battery terminals, which are proximate to or integrated with the housing. An electrical lead 36 can be made from a thin metal strip connecting the anode or negative electrode to one of the cell terminals (the can in the case of the FR6 cell shown in FIG. 1). This may be accomplished embedding an end of the lead within a portion of the anode or by simply pressing a portion such as an end of the lead onto the surface of the lithium foil. The lithium or lithium alloy has adhesive properties and generally at least a slight, sufficient pressure or contact between the lead and electrode will weld the components together. The negative electrode may be provided with a lead prior to winding into a jellyroll configuration. The lead, along with other electrical connections throughout the cell design, may also be connected via appropriate welds.

The metal strip comprising the lead 36 is often made from nickel or nickel plated steel with sufficiently low resistance in order to allow sufficient transfer of electrical current through the lead. Examples of suitable negative electrode lead materials include, but are not limited to, copper, copper alloys, for example copper alloy 7025 (a copper, nickel alloy comprising about 3% nickel, about 0.65% silicon, and about 0.15% magnesium, with the balance being copper and minor impurities); and copper alloy 110; and stainless steel. Lead materials should be chosen so that the composition is stable within the electrochemical cell including the nonaqueous electrolyte.

The cathode is in the form of a strip that comprises a current collector and a mixture that includes one or more electrochemically active materials, usually in particulate form. Iron disulfide ($FeS_2$) is primary active material, although reference to $FeS_2$ is also intended to generically refer slight variations thereof which are also electrochemically active (e.g., $Fe_{(1-x)}M_xS_{(2-2x)}$, etc.). The cathode may contain small amounts of one or more additional active materials, depending on the desired cell electrical and discharge characteristics. The additional active cathode material may be any suitable active cathode material, including materials where minor amounts of dopants are naturally or deliberately introduced to improve the performance of the material. Examples include metal oxides, $Bi_2O_3$, $C_2F$, $CF_x$, $(CF)_n$, $CoS_2$, $CuO$, $CuS$, $FeS$, $FeCuS_2$, $MnO_2$, $Pb_2Bi_2O_5$ and $S$. Preferably, the active material for a $Li/FeS_2$ cell cathode comprises at least about 50 w.t %, at least about 80 wt. % and at least about 95 wt. % of pyrite or $FeS_2$, and most preferably pyrite or $FeS_2$ is the sole active cathode material. Pyrite having a purity level of at least 95 weight percent $FeS_2$ is available from Washington Mills, North Grafton, Mass., USA; Chemetall GmbH, Vienna, Austria; and Kyanite Mining Corp., Dillwyn, Va., USA. Note that the discussion of "purity" of pyrite or $FeS_2$ acknowledges that pyrite is a specific and preferred mineral form of $FeS_2$, which often times has small levels of impurities (typically silicon oxides). Because only the $FeS_2$ (and slight variations thereof) is electrochemically active in pyrite, references to percent purity of $FeS_2$ in a pyrite sample are made with respect to the total amount of pyrite, usually on a weight percentage basis. Thus, pyrite and $FeS_2$ are only sometimes synonymous when read in proper context. As used throughout, any reference to "pyrite" refers to any cathode active material where $FeS_2$ is the major, but not necessarily the sole, active component.

The cathode mixture, formulated as described above, is coated onto one or both sides of a thin metal strip which serves as the cathode current collector. Aluminum is a commonly used material, although titanium, copper, steel, other metallic foils and alloys thereof are also possible. The current collector may extend beyond the portion of the cathode containing the cathode mixture. This extending portion of the current collector can provide a convenient area for making contact with the electrical lead connected to the positive terminal, preferably via a spring or pressure contact that obviates the need for a lead and/or welded contacts. It is desirable to keep the volume of the extending portion of the current collector to a minimum to make as much of the internal volume of the cell available for active materials and electrolyte. Examples of typical coating configurations for the cathode can be found in U.S. Patent Publication No. 20080026293, which is incorporated by reference.

The cathode is electrically connected to the positive terminal of the cell. This may be accomplished with an electrical lead, often in the form of a thin metal strip or a spring, as shown in FIG. 1, although welded connections are also possible. If used, this lead can be made from nickel plated stainless steel or other appropriate materials. In the event an optional current limiting device, such as a standard PTC, is utilized as a safety mechanism to prevent runaway discharge/heating of the cell, suitable PTCs is sold by Tyco Electronics in Menlo Park, Calif., USA. Generally speaking, lower resistance PTC devices are preferred. Alternative current limiting devices can be found in U.S. Publication Nos. 20070275298 and 20080254343, which are incorporated by reference.

With respect to the cathode, the cathode is coated onto a metallic foil current collector, typically an aluminum foil with a thickness between about 16 and 20 μm. The cathode is formed as a mixture which contains a number of materials that must be carefully selected to balance the processability, conductivity and overall efficiency of the coating, as described above. These components are mixed into a slurry in the presence of a solvent, such as trichloroethylene, and then coated onto the current collector. The resulting coating is preferably dried and densified after coating, and it consists primarily of iron disulfide (and its impurities); a binder to hold the particulate materials together and adhere the mixture to the current collector; one or more conductive materials such as metal, graphite and carbon black powders to provide improved electrical conductivity to the mixture; and optional processing/rheological aids, such as fumed silica and/or an overbased calcium sulfonate complex.

The cathode mixture is applied to the foil collector using any number of suitable processes, such as three roll reverse, comma coating or slot die coating. After or concurrent with drying to remove any unwanted solvents, the resulting cathode strip is densified via calendering or the like to further compact the entire positive electrode. In light of the fact that this strip will then be spirally wound with separator and a similarly (but not necessarily identically) sized anode strip to form a jellyroll electrode assembly, this densification optimizes loading of electrochemical material in the jellyroll electrode assembly while also improving the electrical and possibly adhesive properties of the coating itself.

However, the cathode cannot be over-densified as some internal cathode voids are needed to allow for expansion of the iron disulfide during discharge and wetting of the iron disulfide by the organic electrolyte. More practically, there are also operational limits as to the amount of force that can be applied to compact the coatings to high densities, and the stress on the current collector created by such forces can result in unwanted stretching and/or actual de-lamination of the coating. Therefore, it is preferable that the solids packing percentage in the final densified cathode must be sufficient to allow for the electrochemical reaction to proceed, while the formulation must be optimized to include sufficient binder to maintain adhesion of the active and other materials. Preferred ranges for densification according to the invention are described above.

Separator

The separator is a thin microporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. However, it is desirable to minimize the amount of separator extending beyond the electrodes.

To provide good high power discharge performance, it is desirable that the separator have the characteristics (pores with a smallest dimension of at least about 0.005 µm and a largest dimension of no more than about 5 µm across, a porosity in the range of about 30 to 70 percent, an area specific resistance of from 2 to 15 ohm-cm$^2$ and a tortuosity less than 2.5) disclosed in U.S. Pat. No. 5,290,414, issued Mar. 1, 1994, and hereby incorporated by reference. Other desirable separator properties are described in U.S. Patent Publication No. 20080076022, which is hereby incorporated by reference.

Separators are often made of polypropylene, polyethylene or both. The separator can be a single layer of biaxially oriented microporous membrane, or two or more layers can be laminated together to provide the desired tensile strengths in orthogonal directions. A single layer is preferred to minimize the cost. The membrane should have a thickness between 16 and 25 microns, depending upon the cathode formulation and constraints on container strength disclosed herein. Suitable separators are available from Tonen Chemical Corp., available from EXXON Mobile Chemical Co., Macedonia, N.Y., USA and Entek Membranes in Lebanon, Oreg., USA.

Electrolyte

A nonaqueous electrolyte, containing water only in very small quantities (e.g., no more than about 2000 to 500 parts per million by weight, depending on the electrolyte salt being used), is used in the battery cell of the invention. The electrolyte contains one or more lithium-based electrolyte salts dissociated in one or more organic solvents. Suitable salts include one or more of the following: lithium bromide, lithium perchlorate, lithium hexafluorophosphate, potassium hexafluorophosphate, lithium hexafluoroarsenate, lithium trifluoromethanesulfonate and lithium iodide, although the salt preferably includes I$^-$ (e.g., by dissociation or decomposition of LiI and/or other additives in the solvent blend). Suitable organic solvents include one or more of the following: methyl formate, γ-butyrolactone, sulfolane, acetonitrile, 3,5-dimethylisoxazole, n,n-dimethyl formamide and ethers, although at least 50 volume percent of the total solvents must be ether because its low viscosity and wetting capability appear to positively influence the thicker electrode constructions described below. Preferred ethers can be acyclic (e.g., 1,2-dimethoxyethane, 1,2-diethoxyethane, di(methoxyethyl) ether, triglyme, tetraglyme and diethyl ether) and/or cyclic (e.g., 1,3-dioxolane, tetrahydrofuran, 2-methyl tetrahydrofuran and 3-methyl-2-oxazolidinone). 1,3-dioxolane and 1,2-dimethoxyethane are the preferred solvents, while lithium iodide is the preferred salt, although it may be used in combination with lithium triflate, lithium imide or lithium perchlorate. Additives that result in the creation of I$^-$ dissociated in the solvent blend may also be used.

Cell Assembly

The anode, cathode and separator strips are combined together in an electrode assembly. The electrode assembly may be a spirally wound design, such as that shown in FIG. 1, made by winding alternating strips of cathode, separator, anode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing. The anode can be the outermost electrode, as shown in FIG. 1, or the cathode can be the outermost electrode. Either electrode can be in electrical contact with the cell container, but internal short circuits between the outmost electrode and the side wall of the container can be avoided by matching the polarity of the outermost wind of the electrode assembly to that of the can.

The cell can be closed and sealed using any suitable process. Such processes may include, but are not limited to, crimping, redrawing, colleting and combinations thereof. For example, for the cell in FIG. 1, a bead is formed in the can after the electrodes and insulator cone are inserted, and the gasket and cover assembly (including the cell cover, contact spring and vent bushing) are placed in the open end of the can.

The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold and retain the gasket, cover assembly, PTC device and terminal cover and complete the sealing of the open end of the can by the gasket.

Improvements to the electrochemical cell can be measured based on the electrochemical cell performance under a variety of different high rate tests. Ultimately, the best performing, prior art FR6 cell known to the inventor had a DSC performance of about 330 minutes. This prior art cell also had approximately 22 mg of cathode mix, including 92 wt. % of pyrite, per $cm^2$ on a single side of the two-sided cathode current collector and 220 $cm^2$ of total interfacial surface area between the electrodes, resulting in approximately 18 mWh/$cm^2$ of interfacial surface area for the DSC test. Other known FR6 cells typically varied between about 18 mg to 25 mg of mix/$cm^2$ of a single side of the cathode (based on between 80 to 88 wt. % pyrite) and 200 to 220 $cm^2$ of interfacial surface area; however, these cells did markedly worse on the DSC test, typically yielding no better than about 260 to 285 minutes and about 15 to 17 mWh/$cm^2$. In a few cases, cells were observed to have loading 28 mg or more of mix/$cm^2$, but these cells performed the worst of all known prior art on the DSC test (e.g., usually less than 250 minutes, sometimes even providing no service), possibly explained by their choice of electrolyte, solids packing and/or relatively low weight percentage of pyrite. In every instance, all known prior art FR6 cells had an anode consisting of at least 99.5 wt. % lithium with a thickness less than about 165 microns and a cathode coating having less than 93 wt. % of pyrite.

The amount of $FeS_2$ in the cathode coating can either be determined by analyzing the mixture prior to fabrication of the battery or by determining the iron content post-formulation and correlating the detected level of iron to the weight percentage of pyrite in the cathode. The method of testing for iron content post-fabrication can be conducted by dissolving a known amount (in terms of mass and volume/area) of cathode in acid, then testing for the total amount of iron in that dissolved sample using common quantitative analytical techniques, such as inductively coupled plasma atomic emission spectroscopy or atomic absorption spectroscopy. Testing of known coated cathode formulations according to this method have verified that the total amount of iron is representative of $FeS_2$ in the cell (particularly to the extent that is desirable to maximize the purity of $FeS_2$ in the cathode coating). It may also be possible to determine cathode density using a pycnometer, although certain binders may experience volumetric changes when exposed to the internal environment of a lithium-iron disulfide cell such that the density established by such methods may need to be adjusted further in order to arrive at the cathode dry mix density.

Notably, testing for the quantity of aluminum in the sample will allow for calculation of the thickness of the current collector (when the collector is aluminum) in a similar manner (e.g., ICP-AES or AA spectroscopy). Other similar analytical techniques may be employed to test for binders, processing aids and the like, depending upon the atomic and/or molecular composition of those components, and analysis of the anode and/or separator is possible using similar analytical and quantitative/qualitative techniques.

To the extent that the weight per unit area of the cathode, porosity/packing or other cathode characteristics are to be determined from a post-fabrication, the cathode should be rinsed to remove any electrolyte or other contaminants and thoroughly dried to insure solvent does not contribute to the measure weight. The weight contribution from the current collector may then be subtracted from this measurement through the appropriate empirical analysis of the collector described above. Similarly, comparative density measurements may be taken, including differential adjustments for the current collector, in order to determine the void space/solids packing.

Resistance, resistivity and conductivity of the electrodes, and especially for the cathode coating, can be performed according to a variety of methods. A "2 probe" method involves applying direct current to samples (coated with gold to eliminate contact resistance between the probes and the sample) and measuring the voltage using an instrument such as a Solartron Battery Tester 1462 model with a loading of 2 pounds and a 4 wire configuration set to eliminate contact resistance between the leads and the probes. A separate "4 probe" method may also be useful, wherein a Mitsubishi Loresta IP MCP-T250 resistance meter and Mitsubishi Loresta ESP four point probe is utilized. Impedance can be measured according to any number of conventional methods well known in the art.

Other analyses or measurements may also be performed on specific components extracted from a post-fabricated cell. In such situations, care should be taken to remove any unwanted variables that might affect the analysis/measurement (e.g., rinsing of electrolyte salt). Additionally, those having skill in the art may be able to infer certain characteristics based upon indirect observation.

The entirety of the above description is particularly relevant to FR6 and FR03 cells. However, the invention might also be adapted to other cylindrical cell sizes where the sidewall height exceeds the diameter of the container, cells with other cathode coating schemes and/or seal and/or pressure relief vent designs.

Features of the invention and its advantages will be further appreciated by those practicing the invention. Furthermore, certain embodiments of the components and the performance of the cell assembled as described will be realized. It will be understood by those who practice the invention and those skilled in the art that various modifications and improvements may be made to the invention without departing from the teachings of the disclosed concepts. The scope of protection afforded is to be determined by the claims and by the breadth of interpretation allowed by law.

The invention will now be described with reference to the following non-limiting examples.

Example 1

A series of cells were made using different conductor types identified in Table 1 below. Prior to construction of the cell, the surface area of each conductor type was determined and a titration performed to determine the amount of functional groups present in the conductor. These results are also shown in Table 1. FIG. 2 demonstrates good correlation between the amount of functional group (individually and in total) and the surface area of the conductor, irrespective of the type of functional group tested.

TABLE 1

Characteristics of Conductors Studied

| Conductor Type | Surface Area ($m^2/g$) | Carboxylic Groups | Lactonic Groups | Phenolic Groups | Total ($\mu g/g$) |
|---|---|---|---|---|---|
| Expandable graphite | 20 | <1 | <1 | 9 | 11 |
| Expandable graphite and acetylene black mix (3:1) | 30 | <0 | 1 | 6 | 7 |
| Acetylene black | 60 | −4 | 1 | 0 | −3 |
| Carbon black # 1 | 250 | 7 | 12 | 32 | 52 |
| Carbon black # 2 | 950 | −7 | 13 | 45 | 50 |
| Carbon black # 3 | 1475 | 56 | 30 | 97 | 182 |

The cell design and cathode coating formulations for the cells constructed were identical, with 94.4 wt. % pyrite and 2.6 wt. % processing aides and binders being used. The remaining 3 wt. % was varied by conductor type. Additionally, the electrolyte of one series of cells included <1 vol. % of the cosolvent DMI in an electrolyte including DIOX, DME and LiI. Finishing was also varied, with one set being pre-discharged and the other having no predischarge. The cells were then aged for 2 years.

Figure 3:
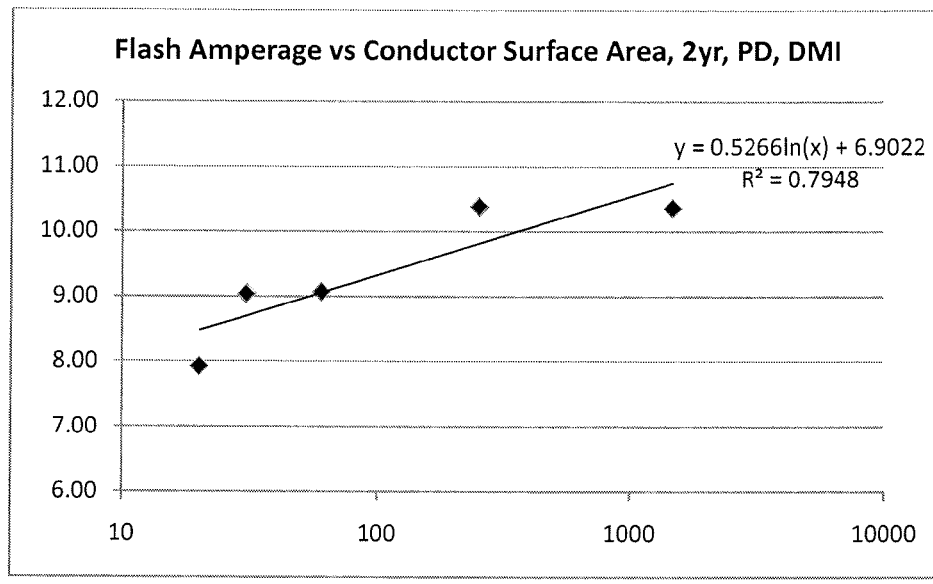
FIG. 3 illustrates the impact conductor surface area may have on flash amperage of certain FR6 batteries.

A potential correlation (R=0.79) was observed between flash amperage and carbon surface area for those cells that were predischarged and contained DMI, as seen in FIG. 3. Generally, flash amperage in the cells also markedly improved, irrespective of conductor type or functionalization, for cells that were predischarged. Therefore, selection of conductors containing functional groups, particularly lactonic and/or phenolic groups, can allow for the upward adjustment of conductor surface area and, by extension, flash amperage performance in certain cells.

Additionally, when the negative values are excluded (i.e., treated as zero) for certain functional groups from Table 1 above, very good correlation was observed between OCV after two years of storage and the selected surface area of the conductor. Thus, once again, selection of conductors containing certain functional groups may allow for better control of the resulting cell OCV, particularly in cathode formulations containing only small amounts of conductor (i.e., less than 3 wt. %).

Example 2

Lots of at least 5 cells were constructed with varying conductor types, conductor weight percentages (as compared to the total dry weight of the mix) and cathode solids packing as shown in Table 2. In the table, PB stands for graphitized carbon and GP for expandable graphite. All formulations used the same anode, electrolyte and raw materials sources (as described above). Ultimately, identical anode to cathode theoretical input ratios were used for all lots.

DSC refers to the Digital Still Camera test as defined by the American National Standards Institute. The standard deviation for all reported DSC values in Table 2 was less than 13 minutes. To the extent that the solids packing necessitated variation in the cathode thickness, the cathode and anode lengths for such cells were adjusted accordingly. Lots 2057-2060 and 2061-2064 all utilized slightly different construction parameters so that they are not directly comparable within the grouping; however, Lot 2057 can be compared with 2061, 2058 with 2062 and so on.

TABLE 2

Cathode formulations (values in wt. % of dry mix).

| Lot # | Carbon Type | Carbon Amount | Solids Packing | DSC service (min) |
|---|---|---|---|---|
| 2057 | PB | 2.2 wt. % | 57% | 330.7 |
| 2058 | PB | 2.2 wt. % | 57% | 329.3 |
| 2059 | PB | 2.2 wt. % | 57% | 346.7 |
| 2060 | PB | 2.2 wt. % | 57% | 325.3 |
| 2061 | GP | 4.4 wt. % | 59% | 322.0 |
| 2062 | GP | 4.4 wt. % | 59% | 329.3 |
| 2063 | GP | 4.4 wt. % | 59% | 329.5 |
| 2064 | GP | 4.4 wt. % | 59% | 327.2 |
| 2066 | PB | 1.8 wt. % | 60% | 333.5 |
| 2067 | PB | 1.8 wt. % | 64% | 339.5 |
| 2068 | PB | 1.8 wt. % | 68% | 338.3 |

As demonstrated by the results above, cells with graphitized carbon at low weight percentages (i.e., <3%) performed as well as, or better than, expandable graphite, although this may be due in part to the slightly greater amount of pyrite provided to the graphitized carbon cells. Nevertheless, the data suggests that the maximum benefit provided by graphitized carbon may only be realized at low solids packing (i.e., ≤64%).

Example 3

A crossed d-optimal mixture designed experiment was conducted for a series of FR6 cells having unique cathode coating formulations, including solids packing, but otherwise standardized components and design features according to the description above. The design of experiment included four mixture components and one process variable, with the component variables being pyrite content (94.2 wt. % as the low end, 97.2 wt. % as the high end), acetylene black content (0 wt. % low, 4.0 wt. % high), graphitized carbon (0 wt. % low, 4.0 wt. % high) and graphite (0 wt. % low, 3.0 wt. % high), wherein the data was analyzed so the combined amount of acetylene black, graphitized carbon and graphite in the final mix was between 1 wt. % and 4 wt. %, which effectively allowed for at least 1.8 wt. % of binder and other processing aids in the dry mix of all lots tested. The process variable was solids packing, with a 60% target on the low end and 72% target on the high end, although in practice the actual constructed cathodes possessed an actual packing of about 58% to 72%. Where appropriate, the data was normalized to account for cathode capacity loading of 40 $mAh/cm^2$ of double-sided cathode. To the extent that the solids packing necessitated variation in the cathode thickness, the cathode and anode lengths for such cells were adjusted accordingly.

The cathodes created under this designed experiment were then subjected to a series of performance metrics and, in some cases, full FR6 cells were built. The resulting sets of data were then analyzed using Design-Expert® software published by Stat-Ease, Inc. of Minneapolis, Minn. In particular, scaled surface response curves were generated to verify the benefits of the cathode formulations described above. Surface response curves were generated at individual solids packing levels to insure meaningful comparisons could be made.

Figure 5A:
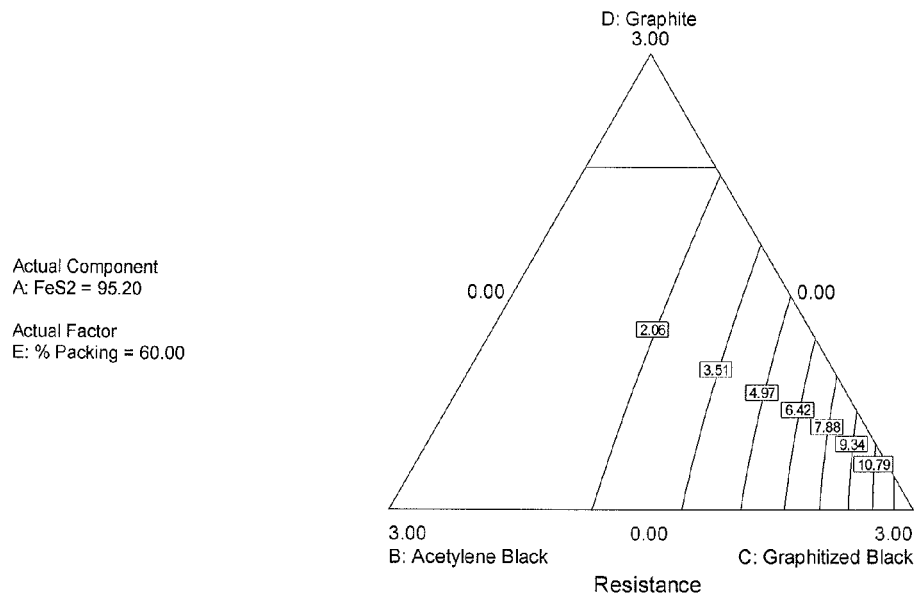
FIGS. 5A through 5D illustrate the impact that the composition of conductor (acetylene black, graphite and/or graphitized carbon) may have on cathode formulations and coatings with respect to resistance measured according to the 4 probe method. Note in this scaled drawing that the numbers at each corner of the triangle represent weight percentages for that particular type of conductor relative to the entire cathode formulation, per the stated conditions to the right of each figure.
Figure 5B:
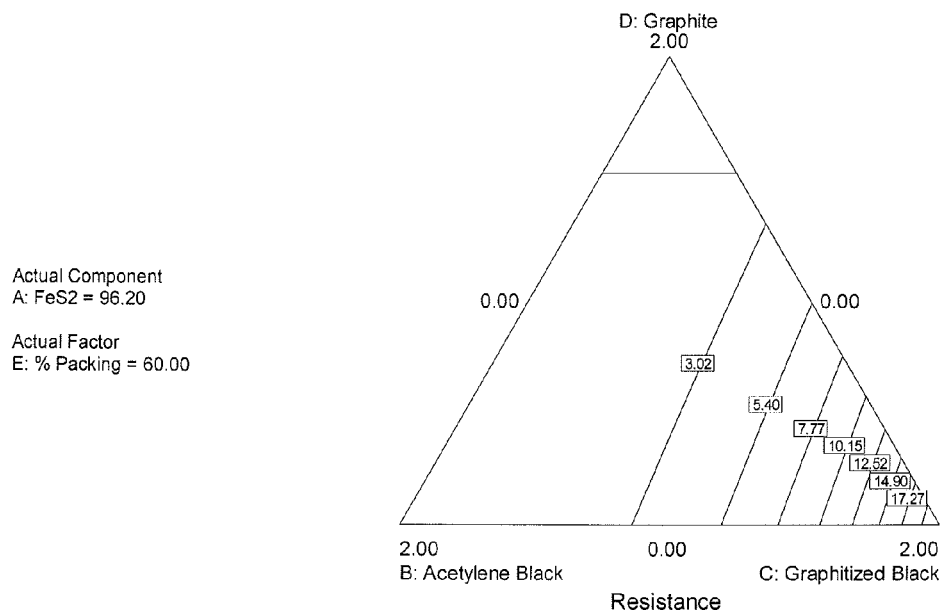
Figure 5C:
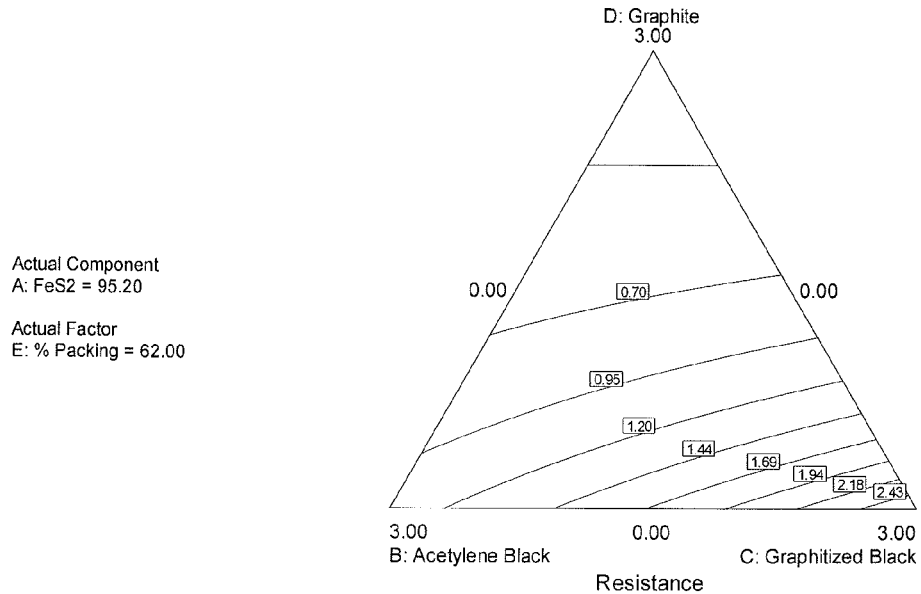
Figure 5D:
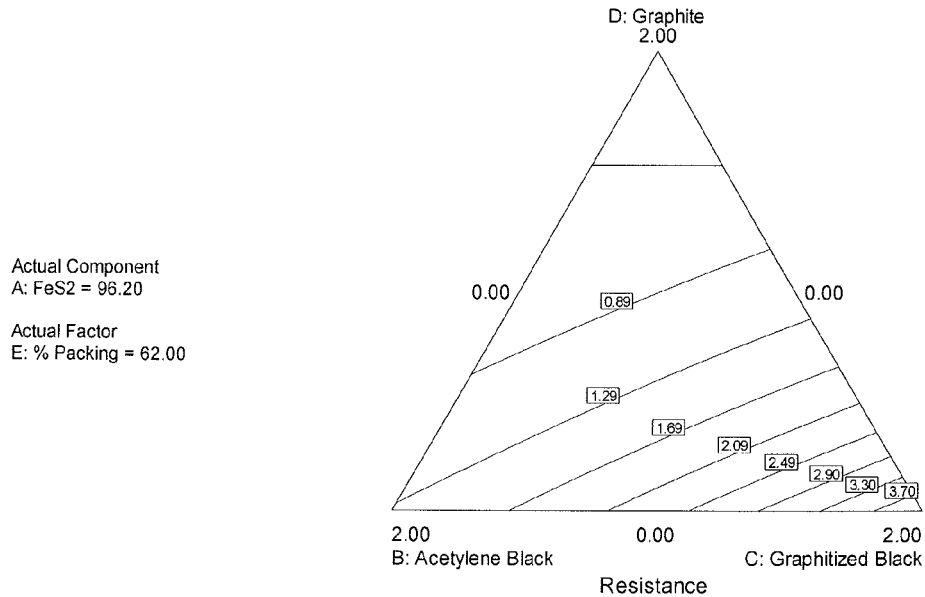

In FIGS. 5A and 5B, the 4 probe resistance of the cathode coatings are shown at low solids packing (i.e., 60%) and two separate levels of high pyrite content (95.2 wt. % and 96.2 wt. %). Past experience has shown that resistance of at least 3 mΩ and at least 5 mΩ correlate well to an impact upon cell performance when those cathode coatings are incorporated within cells. Therefore, a preference for a mixture of acetylene black and graphite is demonstrated at these low packing, high pyrite conditions. A preference for mixes of graphite and acetylene black was also demonstrated at 62% solids packing as seen in FIGS. 5C and 5D, although the total resistance is significantly less. In fact, above 63% solids packing, it appears that the selection of carbon is relatively insignificant in terms of the corresponding impact upon resistance of the cathode coating itself.

Figure 5E:
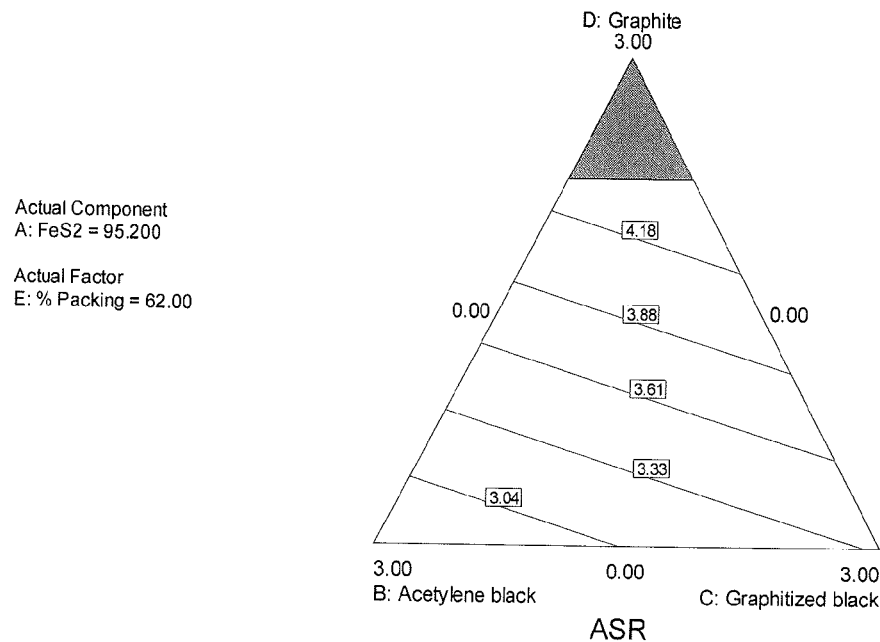
FIG. 5E illustrates the impact that the composition of conductor (acetylene black, graphite and/or graphitized carbon) may have on cathode formulations and coatings with respect to area specific resistance measured according to the 2 probe method. Note in this scaled drawing that the numbers at each corner of the triangle represent weight percentages for that particular type of conductor relative to the entire cathode formulation, per the stated conditions to the right of each figure.
Figure 6A:
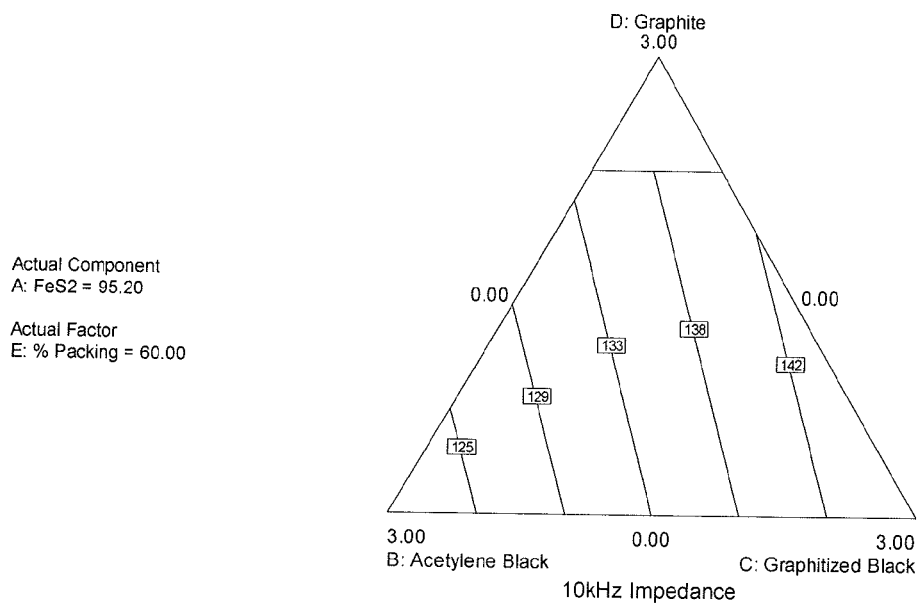
FIGS. 6A through 6D illustrate the impact that the composition of conductor (acetylene black, graphite and/or graphitized carbon) may have on cathode formulations and coatings with respect to 10 kHz impedance in FR6 batteries. Note in this scaled drawing that the numbers at each corner of the triangle represent weight percentages for that particular type of conductor relative to the entire cathode formulation, per the stated conditions to the right of each figure.
Figure 6B:
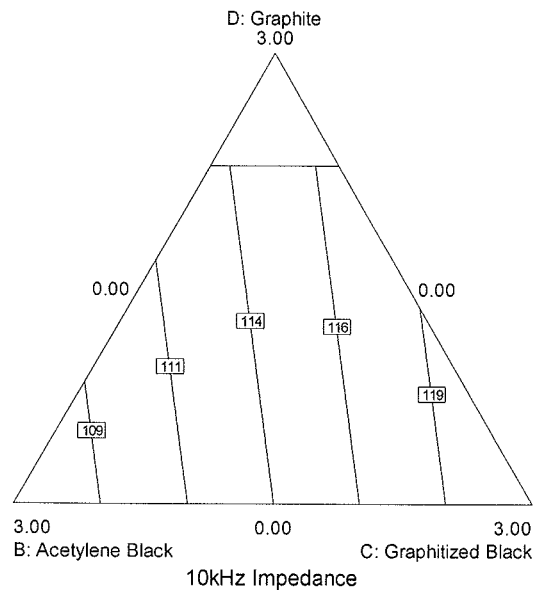
Figure 6C:
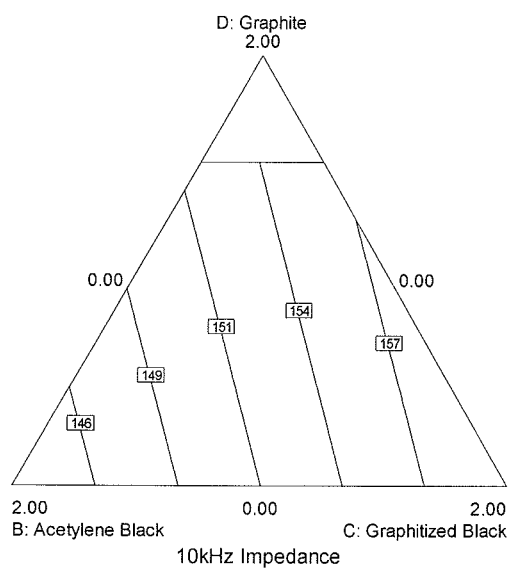
Figure 6D:
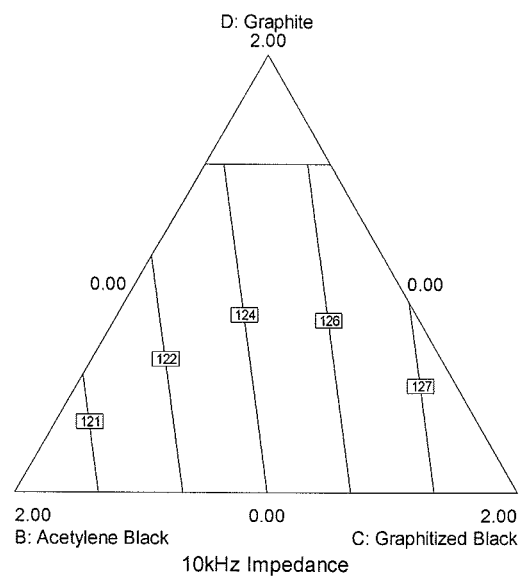
Figure 7A:
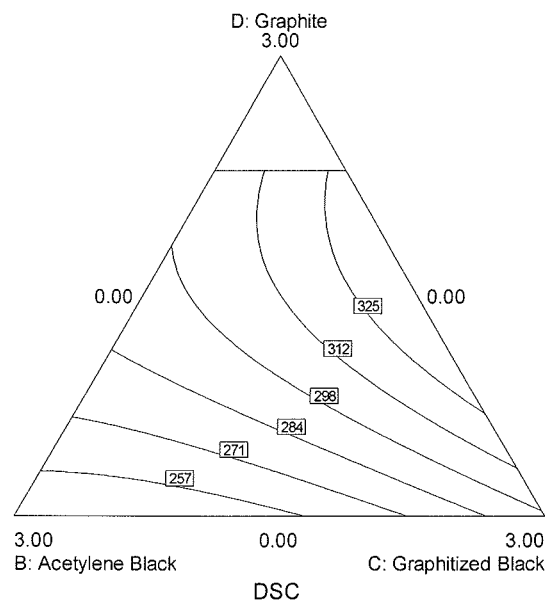
FIGS. 7A through 7F illustrate the impact that the composition of conductor (acetylene black, graphite and/or graphitized carbon) may have on cathode formulations and coatings with respect to digital still camera test performance in FR6 batteries. Note in this scaled drawing that the numbers at each corner of the triangle represent weight percentages for that particular type of conductor relative to the entire cathode formulation, per the stated conditions to the right of each figure.
Figure 7B:
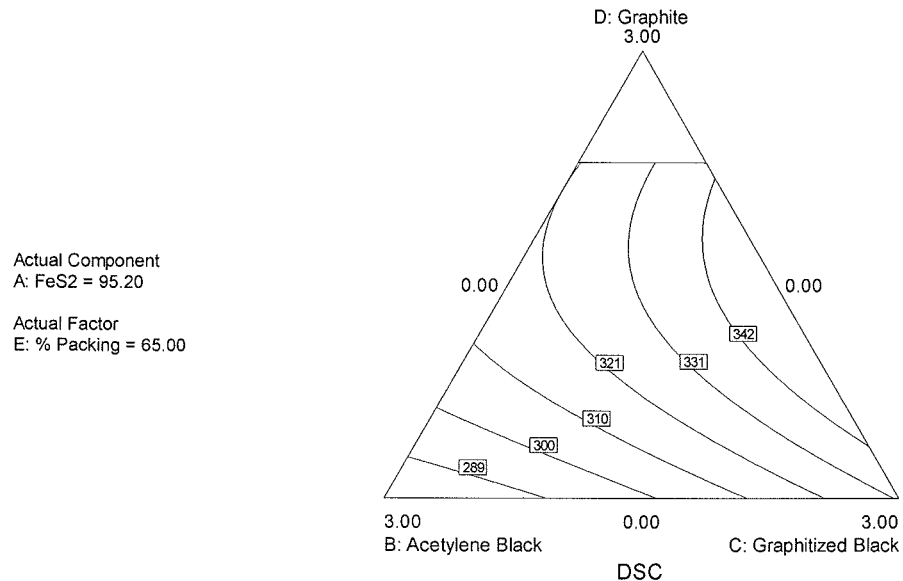
Figure 7C:
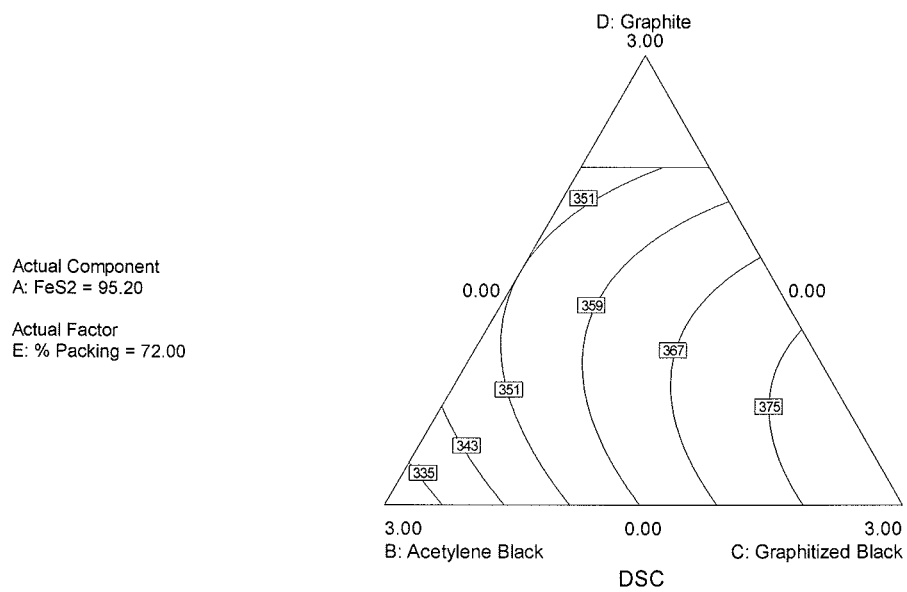
Figure 7D:
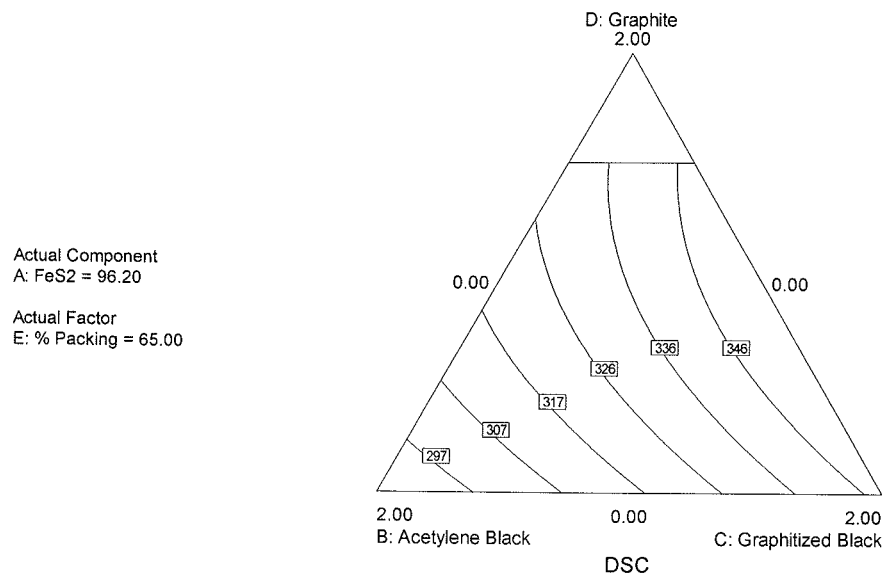
Figure 7E:
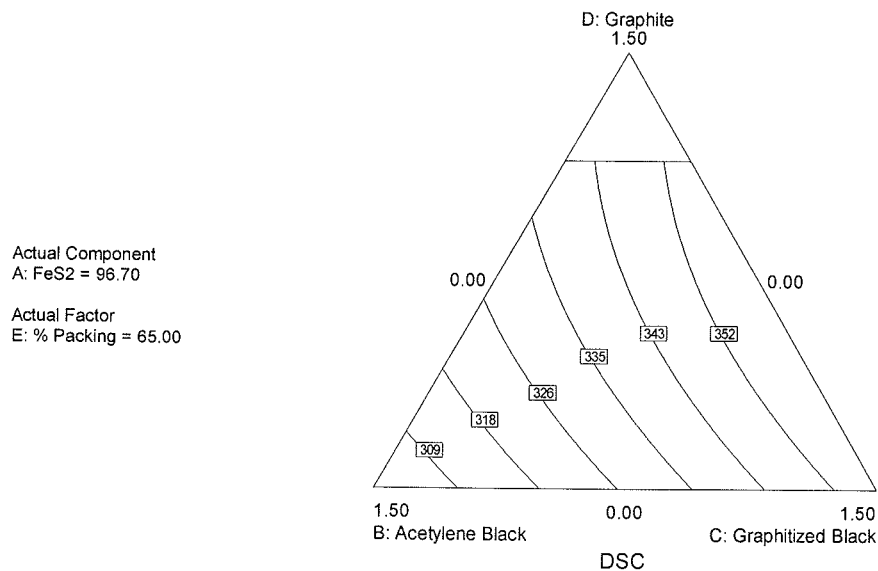
Figure 7F:
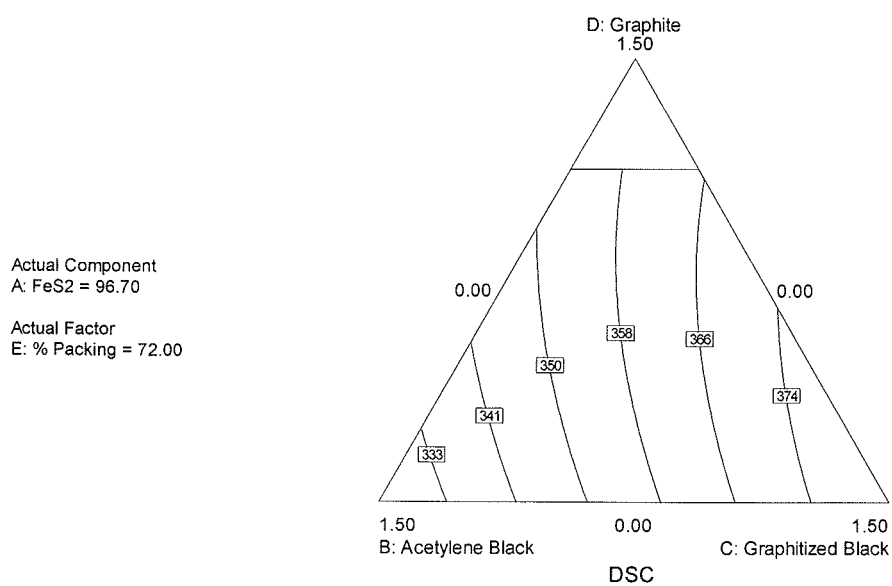

In FIG. 5E, the 2 probe area specific resistance measurements indicate a preference for acetylene black (over graphite or graphitized carbon) at 95.2 wt. % pyrite and 62% packing. However, in this method, while the lowest possible area specific resistance ($\Omega$-cm$^2$) is preferred, the measured value is not directly comparable to the 4 probe resistance measurement. Similar response behaviors for 2 probe resistance were seen at lower packing (i.e., 60%) across the spectrum of high pyrite content formulations studied (i.e., 95-98 wt. %).

FIGS. 6A through 6D illustrate the effect on 10 kHz impedance in fully constructed FR6 cells, wherein the lowest possible impedance is preferred (e.g., <130 mΩ). As above, a preference is demonstrated for low total conductor weight mixes which contain acetylene black as a major component. Also as above, this preference appears to diminish as the solids packing is increased, with coatings above 63% solids packing no longer demonstrating much differentiation between one another.

Lastly, with respect to full cell performance on the digital still camera test, FIGS. 7A through 7F demonstrate the desirability of graphitized carbons in high pyrite content cathode mixes for this high rate test irrespective of the solids packing. Indeed, it appears that mixes containing at least 50 wt. %, at least 55 wt. %, at least 66 wt. % or at least 75 wt. % of graphitized carbon, with the remainder of the conductor weight being graphite, is preferred for the entire range of total conductors (i.e., 1.5 wt. % to 3.0 wt. %), pyrite content (i.e., 95.2 wt. % to 96.7 wt. %) and solids packing (60% to 72%). Consistent with the previous discussion, it is believed that solids packing of 65% or less may possess particular advantages in terms of processability and ability to accommodate reaction products.

While the specific features in the examples above include information regarding particular aspects of the conductor, cathode formulation, cell design and/or other items, it will be understood that the examples must be read in light of this entire disclosure, including items incorporated by reference. As such, additional tests may supplement the information included above. For example, other safety or performance tests may be replicated on the items disclosed in the examples without departing from the inventive aspects disclosed herein.

What is claimed:

1. An electrochemical cell comprising:
   a cylindrical housing;
   a nonaqueous electrolyte including an organic solvent and a spiral wound electrode assembly disposed within the housing;
   wherein the spiral wound electrode assembly includes an anode consisting essentially of lithium or a lithium alloy and a cathode mix coated onto a foil current collector at a final solids packing percentage of at least 58% and no more than 63%;
   wherein the cathode mix comprises at least 95 wt. % of pyrite, less than 2 wt. % of a binder and less than or equal to 2 wt. % of conductors; and
   wherein the conductors include graphite and at least 50 wt. % of acetylene black.

2. The electrochemical cell according to claim 1, wherein the graphite is mechanically expanded graphite.

3. The electrochemical cell according to claim 1, wherein the cathode mix consists essentially of 95-98 wt. % pyrite, 1-2 wt. % conductors and less than 2 wt. % of a binder and, optionally, processing aids.

4. The electrochemical cell according to claim 1, wherein the cathode mix comprises at least 96 wt. % of pyrite.

5. The electrochemical cell according to claim 1, wherein the solids packing percentage is at least 58% and no more than 60%.

6. The electrochemical cell according to claim 1, wherein the conductor includes lactonic or phenolic functional groups.

7. The electrochemical cell according to claim 1, wherein the conductor includes functional groups at a concentration of less than about 50 µg of functional group/g of conductor.

8. The electrochemical cell according to claim 1, wherein the conductors include at least 55 wt. % of acetylene black.

9. An electrochemical cell comprising:
   a cylindrical housing;
   a nonaqueous electrolyte including an organic solvent and a spiral wound electrode assembly disposed within the housing;
   wherein the spiral wound electrode assembly includes an anode consisting essentially of lithium or a lithium alloy and a cathode mix coated onto a foil current collector at a final solids packing percentage of at least 58% and no more than 63%;
   wherein the cathode mix comprises at least 95 wt. % of pyrite, less than 2 wt. % of a binder and less than or equal to 2 wt. % of conductors; and
   wherein the conductors include graphitized carbon and graphite.

10. The electrochemical cell according to claim 9, wherein the graphitized carbon comprises at least 50 wt. % of the conductors.

11. The electrochemical cell according to claim 9, wherein the graphite is mechanically expanded graphite.

12. The electrochemical cell according to claim 9, wherein the cathode mix is coated to a solids packing percentage between at least 58% and no more than 60%.

13. The electrochemical cell according to claim 9, wherein the cathode mix comprises at least 96 wt. % of pyrite.

14. The electrochemical cell according to claim 9, wherein the conductor includes lactonic or phenolic functional groups.

15. The electrochemical cell according to claim 9, the conductor includes functional groups at a concentration of less than about 50 µg of functional group/g of conductor.

16. The electrochemical cell according to claim 9, wherein the cathode mix consists essentially of 95-98 wt. % pyrite, 1-2 wt. % conductors and less than 2 wt. % of a binder and, optionally, processing aids.

* * * * *